US010983811B2

(12) United States Patent
Ozer et al.

(10) Patent No.: US 10,983,811 B2
(45) Date of Patent: *Apr. 20, 2021

(54) MULTI-PROCESS MODEL FOR CROSS-PLATFORM APPLICATIONS

(71) Applicant: Apple Inc., Cupertino, CA (US)

(72) Inventors: Ali T. Ozer, Redwood City, CA (US); Russell A. Bishop, San Francisco, CA (US); Aaditya Chandrasekhar, San Francisco, CA (US); Christopher A. Dreessen, Santa Clara, CA (US); Kristin M. Forster, Los Altos Hills, CA (US); Jeremiah R. Sequoia, Woodside, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/143,404

(22) Filed: Sep. 26, 2018

(65) Prior Publication Data

US 2019/0370091 A1 Dec. 5, 2019

Related U.S. Application Data

(60) Provisional application No. 62/679,833, filed on Jun. 3, 2018.

(51) Int. Cl.
*G06F 9/451* (2018.01)
*G06F 9/54* (2006.01)
(Continued)

(52) U.S. Cl.
CPC ............ *G06F 9/452* (2018.02); *G06F 3/0484* (2013.01); *G06F 3/0486* (2013.01);
(Continued)

(58) Field of Classification Search
None
See application file for complete search history.

(56) References Cited

U.S. PATENT DOCUMENTS

| 5,339,422 A | 8/1994 | Brender et al. |
| 5,675,796 A | 10/1997 | Hodges |
| (Continued) | | |

FOREIGN PATENT DOCUMENTS

| WO | 0195107 A2 | 12/2001 |
| WO | 2019236207 | 12/2019 |

OTHER PUBLICATIONS

PCT/US2019/028863 "Invitation to Pay Additional Fees and, Where Applicable, Protest Fee" dated Aug. 8, 2019, 16 pages.
(Continued)

*Primary Examiner* — Syed A Roni
(74) *Attorney, Agent, or Firm* — Jaffery Watson Mendonsa & Hamilton LLP

(57) ABSTRACT

Embodiments described herein provide for a multi-process model to support compiling applications for multiple platforms. In one embodiment, applications designed for execution on a mobile platform can be ported to and/or compiled for execution on a desktop/laptop platform without requiring modification of the core program code of the mobile application. The mobile application is executed using a multi-process (e.g., two or more process) model in which the core mobile application program generates content that is displayed by a host process. The host process enables automatic translation of program calls to generate mobile user interface elements into program calls that generate user interface elements of the host platform. The translation can be performed using a multi-process (e.g., two or more process) model in which the core application program generates content that is displayed by a host process.

22 Claims, 34 Drawing Sheets

(51) Int. Cl.
    *G06F 8/76*     (2018.01)
    *G06F 3/0484*     (2013.01)
    *G06F 9/30*     (2018.01)
    *G06F 3/0486*     (2013.01)
    *G06F 8/41*     (2018.01)

(52) U.S. Cl.
    CPC ............ *G06F 3/04847* (2013.01); *G06F 8/47* (2013.01); *G06F 8/76* (2013.01); *G06F 9/30065* (2013.01); *G06F 9/451* (2018.02); *G06F 9/543* (2013.01); *G06F 9/546* (2013.01); *G06F 9/547* (2013.01)

(56) References Cited

U.S. PATENT DOCUMENTS

| | | | |
|---|---|---|---|
| 5,831,609 | A | 11/1998 | London et al. |
| 6,711,672 | B1 | 3/2004 | Agesen |
| 7,676,811 | B2 | 3/2010 | Davis et al. |
| 8,291,078 | B2 | 10/2012 | Fisher et al. |
| 8,645,973 | B2 | 2/2014 | Bosworth |
| 8,683,496 | B2 | 3/2014 | Reeves et al. |
| 8,738,814 | B1 | 5/2014 | Cronin |
| 9,424,075 | B1 | 8/2016 | Halim |
| 9,582,601 | B2 | 2/2017 | D'Aurelio et al. |
| 2006/0123345 | A1 | 6/2006 | Parimi |
| 2006/0248451 | A1 | 11/2006 | Szyperski et al. |
| 2007/0234285 | A1 | 10/2007 | Mendoza et al. |
| 2008/0140767 | A1 | 6/2008 | Rao et al. |
| 2010/0257539 | A1 | 10/2010 | Narayanan et al. |
| 2012/0084792 | A1 | 4/2012 | Benedek et al. |
| 2012/0291038 | A1 | 11/2012 | Clevenger |
| 2013/0041969 | A1 | 2/2013 | Falco et al. |
| 2013/0191434 | A1 | 7/2013 | Smith et al. |
| 2013/0290857 | A1 | 10/2013 | Beveridge |
| 2014/0026057 | A1 | 1/2014 | Kimpton et al. |
| 2015/0074684 | A1 | 3/2015 | Goldstein et al. |
| 2015/0193241 | A1 | 7/2015 | Hamzata |
| 2015/0193904 | A1 | 7/2015 | Vermeulen |
| 2017/0034310 | A1 | 2/2017 | Victorelli |
| 2019/0369987 | A1 | 12/2019 | Chandrasekhar et al. |
| 2019/0370033 | A1 | 12/2019 | Bishop et al. |

OTHER PUBLICATIONS

PCT/US2019/028863, Notification of Transmittal of the International Search Report and the Written Opinion of the International Searching Authority, dated Oct. 15, 2019, pp. 22.

MULTI-PROCESS MODEL FOR CROSS-PLATFORM APPLICATIONS

CROSS-REFERENCE

This application claims priority to and the benefit of U.S. Provisional Patent Application No. 62/679,833 filed on Jun. 3, 2018, the entire contents of which are incorporated herein by reference.

FIELD

Embodiments described herein relate generally to multi-platform applications and frameworks and, more specifically, to preventing deadlocks in a multi-process model for cross platform applications.

BACKGROUND OF THE DESCRIPTION

The term platform as used in a computer context can refer to the type of processor and/or other hardware on which a given operating system or application program runs, the type of operating system on a computer or the combination of the type of hardware and the type of operating system running on that hardware.

The terms cross-platform, multi-platform, or portable, can be used to describe operating systems and application programs that can run on more than one platform. Multi-platform operating systems can refer to operating systems that can be compiled or configured to run on multiple processor platforms. Multi-platform applications can refer to applications that can be compiled or configured to run on multiple processor platforms and/or multiple operating systems. Multi-platform software can be differentiated between platforms at compile time, while some software can perform runtime differentiation between platforms.

Applications or operating systems that are not multi-platform, in some instances, can be ported between platforms. Porting describes the development of a version of an application or an operating system originally designed for one platform such that the application or operating system can be used on other platforms. The portability of a software project can vary based on the differences between the origin and target platform. Porting a software project can involve changes to core program code, as well as libraries or applications associated with the program code.

SUMMARY OF THE DESCRIPTION

Embodiments described herein provide for a multi-process model to support compiling applications for multiple platforms. In one embodiment, applications designed for execution on a mobile platform can be ported to and/or compiled for execution on a desktop/laptop platform without requiring modification of the core program code of the mobile application. The mobile application is executed using a multi-process (e.g., two or more process) model in which the core mobile application program generates content that is displayed by a host process. The host process enables automatic translation of program calls to generate mobile user interface elements into program calls that generate user interface elements of the host platform. The translation can be performed using a multi-process (e.g., two or more process) model in which the core application program generates content that is displayed by a host process.

One embodiment provides a method of displaying user interface elements of an application via a multi-process model. The method comprises launching, on a second platform, a first process linked with a first graphical interface framework of a first platform, launching, on the second platform, a second process linked with a second graphical interface framework of the second platform, establishing an inter-process communication link between the first process and the second process, instantiating, by the first process, a first graphical interface element using the first graphical interface framework, instantiating, by the second process, a second graphical interface element using the second graphical interface framework, and using the inter-process communication link, displaying the first graphical interface element within the second graphical interface element.

One embodiment provides for a non-transitory machine readable medium storing instructions which, when executed by one or more processors on a host computing platform, cause the one or more processors to perform operations comprising establishing an inter-process communication session from a client application to a service process on the host computing platform, accessing a protocol interface from the client application that enables access to a service provided by the service process, wherein the protocol interface is associated with a remote proxy of an implementation of the service, programmatically creating a remote instance of the implementation of the function via the remote proxy, and invoking functionality provided by the service process at the client application.

One embodiment provides for a data processing system comprising a memory to store instructions for a multi-platform library and a multi-platform application and one or more processors to execute instructions in memory. The instructions cause the one or more processors to load the multi-platform application for execution, wherein a first process of the multi-platform application includes program logic developed for a first device platform and a second process of the multi-platform application includes program logic developed for a second device platform; during the load of the multi-platform application, parse an object file of the multi-platform application to determine a set of symbols to resolve, wherein a first symbol in the set of symbols is associated with the first device platform and the second symbol in the set of symbols is associated with the second device platform; resolve the first symbol and the second symbol from the multi-platform library; and bind the first symbol and second symbol to the multi-platform application.

One embodiment provides for an electronic device that can implement methods or operations described herein.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment.

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

Figure 1:
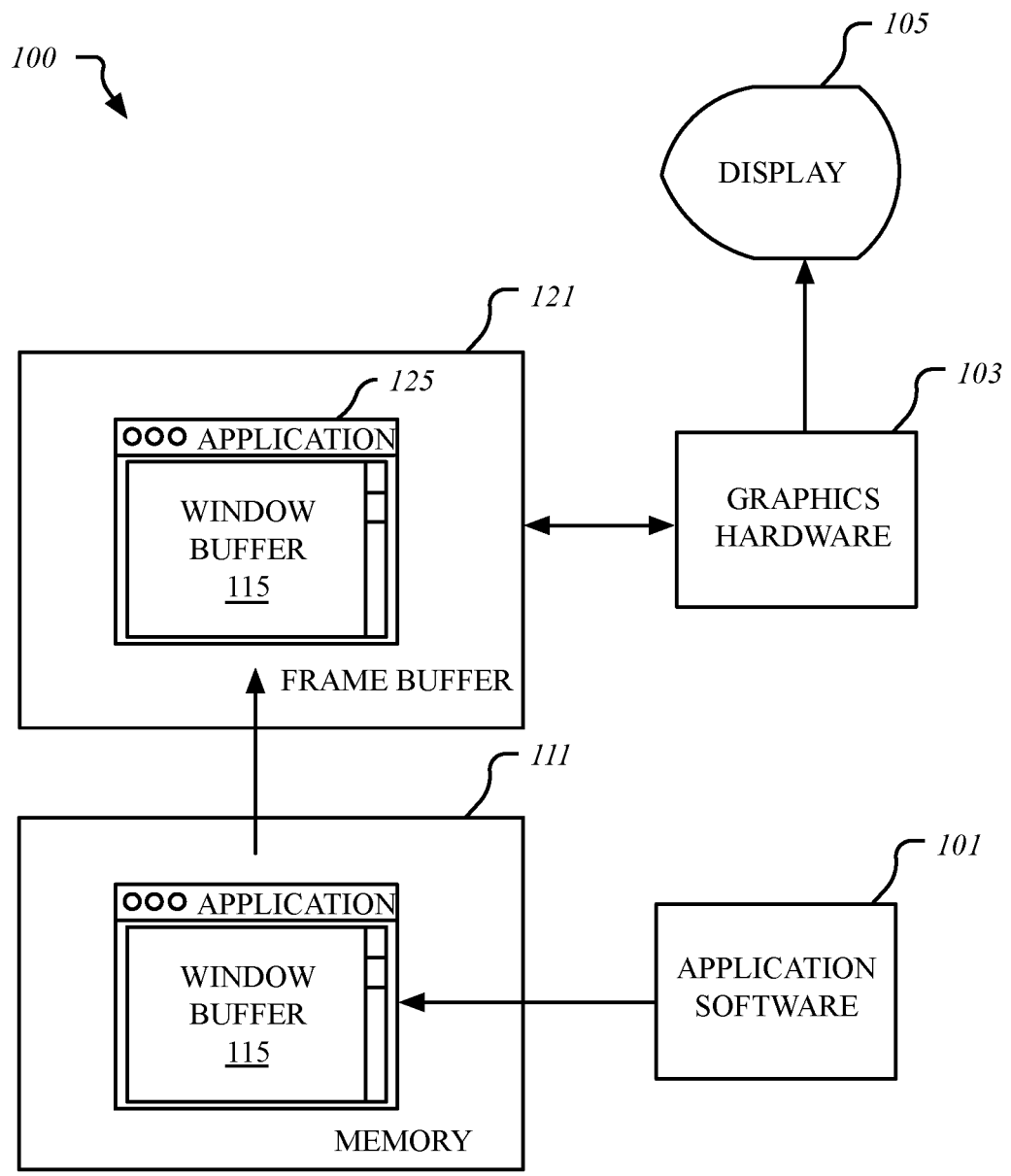
FIG. 1 illustrates a window system for a graphical interface.

FIG. 1 illustrates a window system 100 for a graphical interface. Application software 101 can draw content in into window buffers. The window system 100 can combine the window buffers in a frame buffer to display the corresponding windows on the screen. For example, application software 101 draws content in a window buffer 115 of an application window, which can be allocated in memory 111. A frame buffer 121 contains data for the screen image of the windows that are displayed on the screen of a display device 105 of a computing device. The frame buffer 121 is typically under control of graphics hardware 103 (e.g., a graphics processing unit) which controls the display of the window 125 on the screen of display device 105 using the data in the frame buffer.

Operations for creating the content in windows can be separated from operations for composing a screen image from images of windows for different applications. A variety of applications can create or update images of the windows and/or content for the windows in window buffers. A window system (e.g., window manager) can then compose a screen image from images of the windows in the various window buffers. The window buffers can be managed and drawn independently from the frame buffer. Content in the corresponding window buffers can be copied by the window system to the corresponding locations in the frame buffer to display the windows in these locations on the common screen of the display device.

Figure 2:
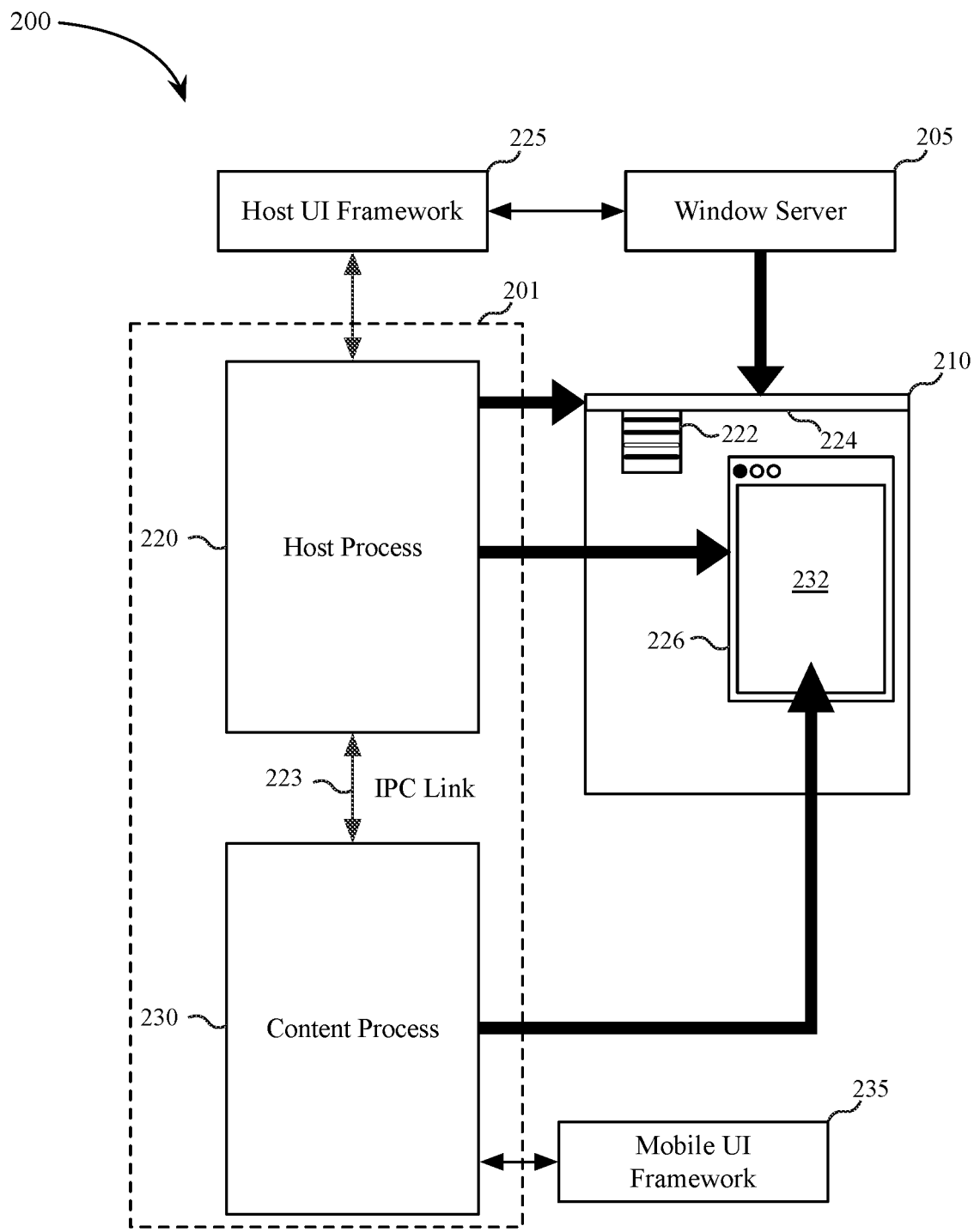
FIG. 2 illustrates a multi-process model to support compiling applications for execution on multiple platforms, according to an embodiment.

FIG. 2 illustrates a multi-process model 200 to support compiling applications for execution on multiple platforms, according to an embodiment. In one embodiment, the multi-process model 200 enables an application 201 to natively execute on an operating system and/or platform that is different from the operating system and/or platform for which the application was originally designed. The application 201 can be compiled for different platforms without requiring any significant modifications to the core program code of the application. The application 201 can execute as two or more processes, including a host process 220 and a content process 230. The content process can be linked against a variant of the original user interface (UI) framework of the application and the host process can be linked against the UI framework of the platform on which the application is to be executed. For example, in one embodiment program code for a mobile application that is designed for execution on a mobile platform can be compiled for execution on a laptop or desktop platform. The program code for the mobile application can be compiled to execute as the content process 230 and is linked against a mobile UI framework 235 for the mobile platform. During execution, the content process 230 can establish an inter-process communication link (IPC link 223) with the host process, which is linked against a host UI framework 225. The host UI framework 225 can provide access to user interface elements for the platform on which the application 201 executes. The IPC link 223 can be established via a variety of inter-process communication methods including, but not limited to sockets, pipes, ports, message queues, and shared memory. In one embodiment, the IPC link 223 is established via the XPC framework provided by Apple Inc. of Cupertino Calif. As described herein, a framework refers to one or more libraries that include objects, methods, data, and other information to facilitate various aspects of an application that is configured to execute on operating environments described herein. In other embodiments the IPC link 223, or an equivalent connection, can be established over a remote procedure call (RPC) connection. While the application 201 is illustrated as including two processes, the application 201 can include two or more processes to perform cross-platform operation. In one embodiment, the application 201 can be a composite of multiple applications, each application having multiple processes.

The host UI framework 225 and the mobile UI framework 235 can each provide objects used by the host process 220 and the content process 230 that are used to implement user interfaces on the respective platforms. The UI frameworks enable the generation and manipulation of windows, panels, buttons, menus, scrollers, and text fields, and the like, and handle the details to of the operations used to draw to a display, including communicating with hardware devices and screen buffers, clearing areas of the screen before drawing, clipping views, etc. However, the host UI framework 225 and mobile UI framework 235 have fundamental differences that should be addressed to enable a mobile application linked against the mobile UI framework 235 to execute correctly on the host platform. For example, some API calls, classes, and objects that serve similar functions differ between the mobile UI framework 235 and the host UI framework 225. Some functions, such as view animation, may differ between the mobile UI framework 235 and the host UI framework 225. Additionally, the mobile UI framework 235, in one embodiment, does not contain interfaces to manage the window server 205, which can be part of the operating system of the host (e.g., laptop, desktop, etc.) platform. Accordingly, the host UI framework 225 can interface with the window server 205 on behalf of the mobile UI framework 235. The host UI framework 225 can communicate with the window server 205 to scale windows, allocate memory buffers for windows, render into window buffers, and generally perform operations to display windows containing UI elements for the application 201.

In one embodiment the host process 220, via the host UI framework 225 and the window server 205, can generate and display a window frame 226, and menu bar 222, and status bar 224 on behalf of the content process 230. The content process 230 can then use the mobile UI framework 235 to create data objects and data for a window buffer 232 that contains content to be displayed for the application 201. Information to describe and/or reference the created data objects and data for the window buffer 232 can be relayed via the IPC link 223 to the host process 220. The host process 220 can use the host UI framework 225 to modify details of the graphical elements that make up contents of the status bar 224, menu bar 222, and window frame 226. The host process 220 can then automatically display the window buffer 232 created by the content process within the window frame 226.

In one embodiment, details for the graphical interface elements to be displayed by the host process 220 can be determined automatically based on metadata associated with the content process 230. For example, a title for the window frame 226 can be determined based on the name of the content process 230 or the name of the mobile application on which the content process 230 is based. Some graphical elements of the status bar 224 or menu bar 222 can also be automatically determined based on metadata associated with the content process 230, or information provided by the content process via the IPC link 223.

In one embodiment, details for the graphical interface elements to be displayed by the host process 220 are determined interactively with the content process 230. For example, one or more elements of the menu bar 222 that will be displayed by the host process 220 can be validated with the content process 230 before display. Elements that do not successfully validate can be grayed-out or otherwise marked as un-selectable when the menu bar 222 is displayed.

For embodiments described herein, exemplary mobile platforms from which applications can be ported include mobile phone, television set-top box, console gaming system, application enabled television, or tablet computing device platforms. In various embodiments, the mobile application code can be compiled and executed via binary translation or can be compiled for direct execution by the processor within the laptop or desktop platform. In some embodiments, a common development environment can be provided for the mobile, laptop, and desktop platforms. The common development environment can be configured to enable application code for a mobile application to be compiled for execution on the laptop and desktop platform without requiring modifications to the application code.

Figure 3:
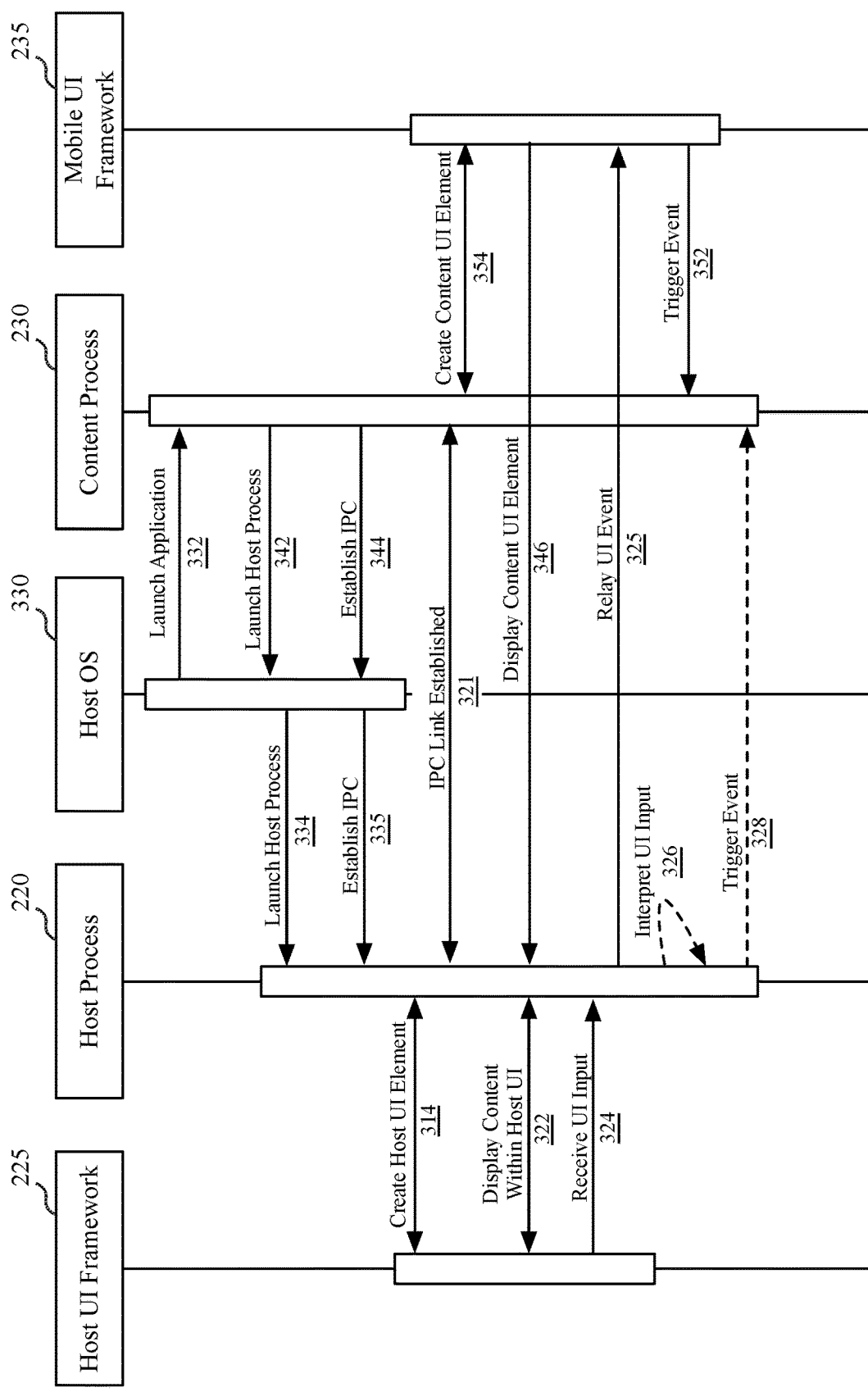
FIG. 3 is a sequence diagram that illustrates process, framework, and OS interaction for a multi-process model application provided by embodiments described herein.

FIG. 3 is a sequence diagram that illustrates process, framework, and OS interaction for a multi-process model application provided by embodiments described herein. A host operating system (host OS 330), in response to an application launch request, can send a message 332 to launch a multi-process model application, which initially results in the launch of the content process 230. The content process can send a message 342 to the host OS 330 to launch the host process. The host OS 330 can then send a message 334 to launch the host process 220. In one embodiment the content process 230 can establish the IPC link (IPC link 223 of FIG. 2) by sending a message 344 to the host OS 330, which can send a message 335 to the host process, which causes the IPC link to be established at 321. In one embodiment the host OS 330 includes a process manager responsible for launching applications or processes. The process manager can manage the content process 230 and the host process 220 automatically upon launch of a multi-process model application that contains the processes.

The IPC link being established, the host process 220 can perform an operation 314 using the host UI framework 225 to create a host UI element, such as a window frame and status bar elements. The content process, via the mobile UI framework 235, can perform an operation 354 to create a content UI element. An operation 346 to display the content UI element is relayed via the IPC link to the host process 220, which can perform an operation 322 to display content within the host UI in conjunction with the host UI framework 225. For example, a pointer to a window buffer containing content to be presented by the application can be provided to the host process 220 via the IPC link, which can display the window buffer within the window frame created via the host UI framework 225.

In one embodiment the illustrated operations and messages are performed and transmitted transparently to the program code of the content process 230. IPC messages performed during execution of the mobile application on the host platform, via the content process 230, can be transmitted automatically by the host OS 330 and application frameworks, including the host UI framework 225 and mobile UI framework 235. The core program code of the mobile application can execute normally, without requiring knowledge of the operations of the host process 220 and host UI framework 225.

A multi-process application can handle UI events using a variety of techniques, depending on the nature of the UI event. A host UI framework 225 can receive a UI event, such as a click event that will be processed by the content process 230. The host UI framework 225 can send a message 324 to program code of the host process 220 upon receipt of UI input. In one embodiment, the host process 220 can send a message 325 to relay the UI event to the mobile UI framework 235. In one embodiment, before the UI event is relayed, the specific type of UI event can be translated from a UI event associated with the host UI framework 225, such as a mouse click input, a touchpad input, or a multi-touch touchpad input, to a corresponding input event for the mobile UI framework 235, such as a touchscreen event or a multi-touch touchscreen event. The mobile UI framework 235 can then send a message 352 to trigger the appropriate software event at the content process 230. In one embodiment, the host process 220, upon receipt of the message 324 regarding the UI input, can perform an operation 326 to interpret the UI input. The host process 220 can then send a message 328 directly to the content process 230 to trigger the appropriate software event. Additionally, some inputs may be handled directly by the host process 220 or the host UI framework 225. For example, a UI input to minimize the window in which the application is executed can be handled directly by the host UI framework 225.

Figure 4:
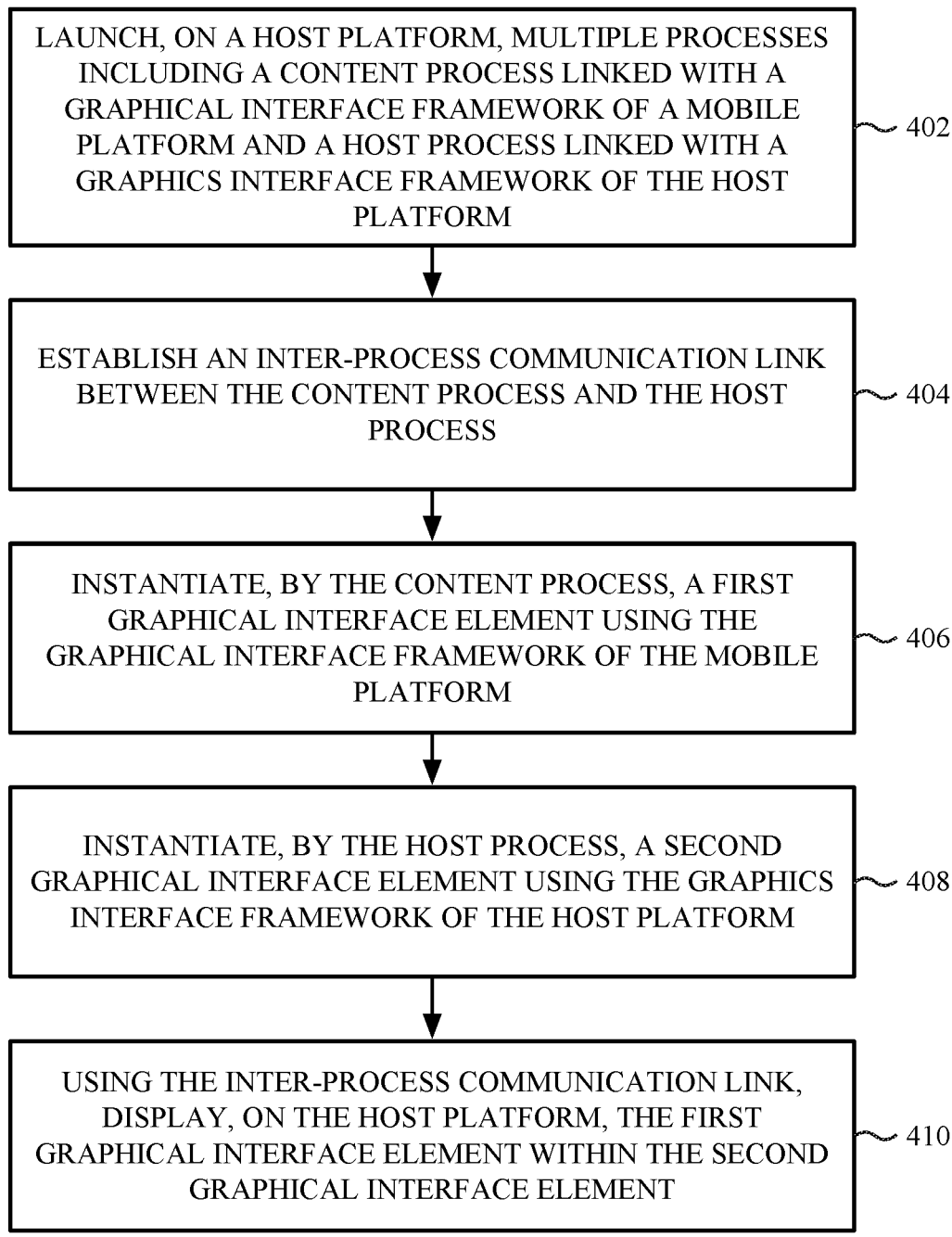
FIG. 4 is a method of displaying content for a ported application using the multi-process model, according to an embodiment.

FIG. 4 is a method 400 of displaying content for a ported application using the multi-process model, according to an embodiment. The method 400 can be performed by processes executing on a host processor of a host platform, such as a laptop or desktop computing device.

In one embodiment, the method 400 includes to launch, on a host platform, multiple processes including a content process linked with a graphical interface framework of a mobile platform and a host process linked with a graphics interface framework of the host platform, as shown at block 402. In one embodiment the content process is content process 230 and the mobile UI framework 235 as described herein and as illustrated in FIG. 2 and FIG. 3.

The method 400 additionally includes to establish an inter-process communication link between the content process and the host process, as shown at block 404. The inter-process communication link can be, for example, IPC link 223 as in FIG. 2.

The method 400 further includes to instantiate, by the content process, a first graphical interface element using the graphical interface framework of the mobile platform, as shown at block 406, and to instantiate, by the host process, a second graphical interface element using the graphics interface framework of the host platform, as shown at block 408. The host process can be host process 220, while the content process can be content process 230, each illustrated in FIG. 2 and FIG. 3.

The method 400 additional includes, using the inter-process communication link, to display, on the host platform, the first graphical interface element within the second graphical interface element, as shown at block 410. The first graphical interface element can be application content within a window buffer. The second graphical interface element can be window frame. The window buffer containing the application content can be automatically displayed within the window frame via the graphical interface of the host platform (e.g., host UI framework 225) without requiring modification of the content process to work with the graphical interface framework of the host platform. Instead the content process can use the graphical interface framework of the mobile platform (e.g., mobile UI framework 235) and have the created graphical UI elements automatically displayed via the host UI framework by the host process using the IPC link.

FIG. 5-FIG. 9B illustrate execution of a mobile application on a host platform, according to embodiments described herein. At least a subset of mobile applications developed for a mobile platform can be compiled as multi-platform applications that can execute on a host platform provided by laptop or desktop operating system. The host environment can provide the same or similar library functionality as the mobile platform, such that a multi-platform application can be compiled for a mobile or host platform without requiring changes to the application software.

Figure 5:
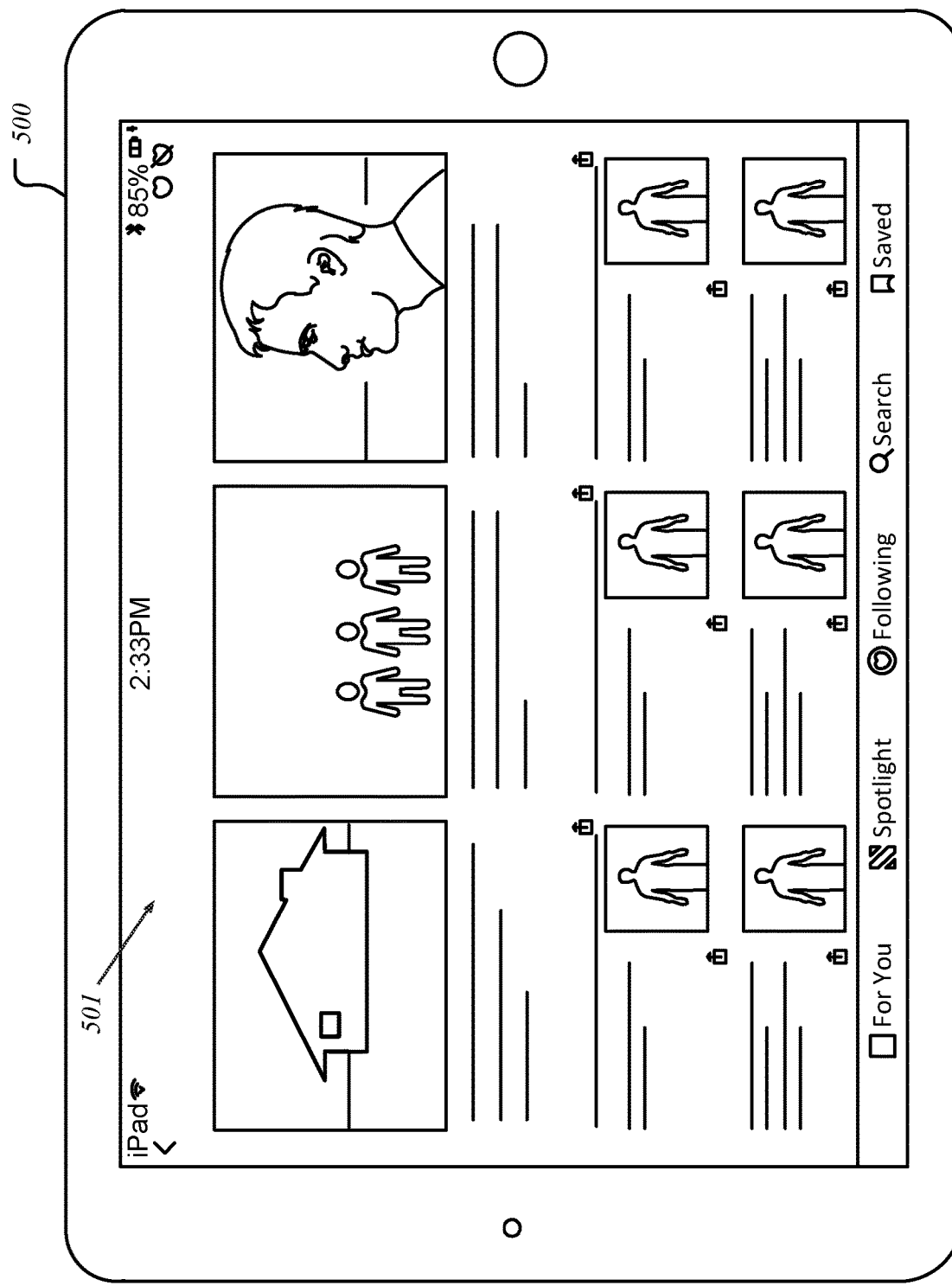
FIG. 5-FIG. 9B illustrate execution of a mobile application on a host platform, according to embodiments described herein.

FIG. 5 illustrates an exemplary mobile application 501 on an exemplary mobile platform 500. The exemplary mobile platform 500 illustrated in FIG. 5 is a tablet computing device. However, the illustrated concepts apply to a variety of mobile platforms that may be embodied within a handheld or embedded computing device, such as but not limited to a smart phones, television set-top box, console gaming system, application enabled television, or electronic kiosk. The mobile application 501 can include various graphical interface elements that are dynamically adaptable based on the type of mobile electronic device on which the application executes, or the size of display of the mobile electronic device, or one or more features of the mobile electronic device or display of the mobile electronic device. For example, elements of the graphical interface of the mobile application 501 can be dynamically configured based on the geometry of the display and the orientation of the mobile electronic device of the represented mobile platform 500.

In one embodiment, display of graphical user interface elements of the mobile application 501 are facilitated via a user interface framework that includes a collection of libraries that application program code can use to display user interface elements on the display of the mobile electronic device. A mobile user interface framework can provide a set of objects used to build mobile applications for execution on a mobile electronic device. The provided set of objects can be used to display content on the display of a mobile electronic device, to interact with displayed content, and manage interactions with the system.

Figure 6:
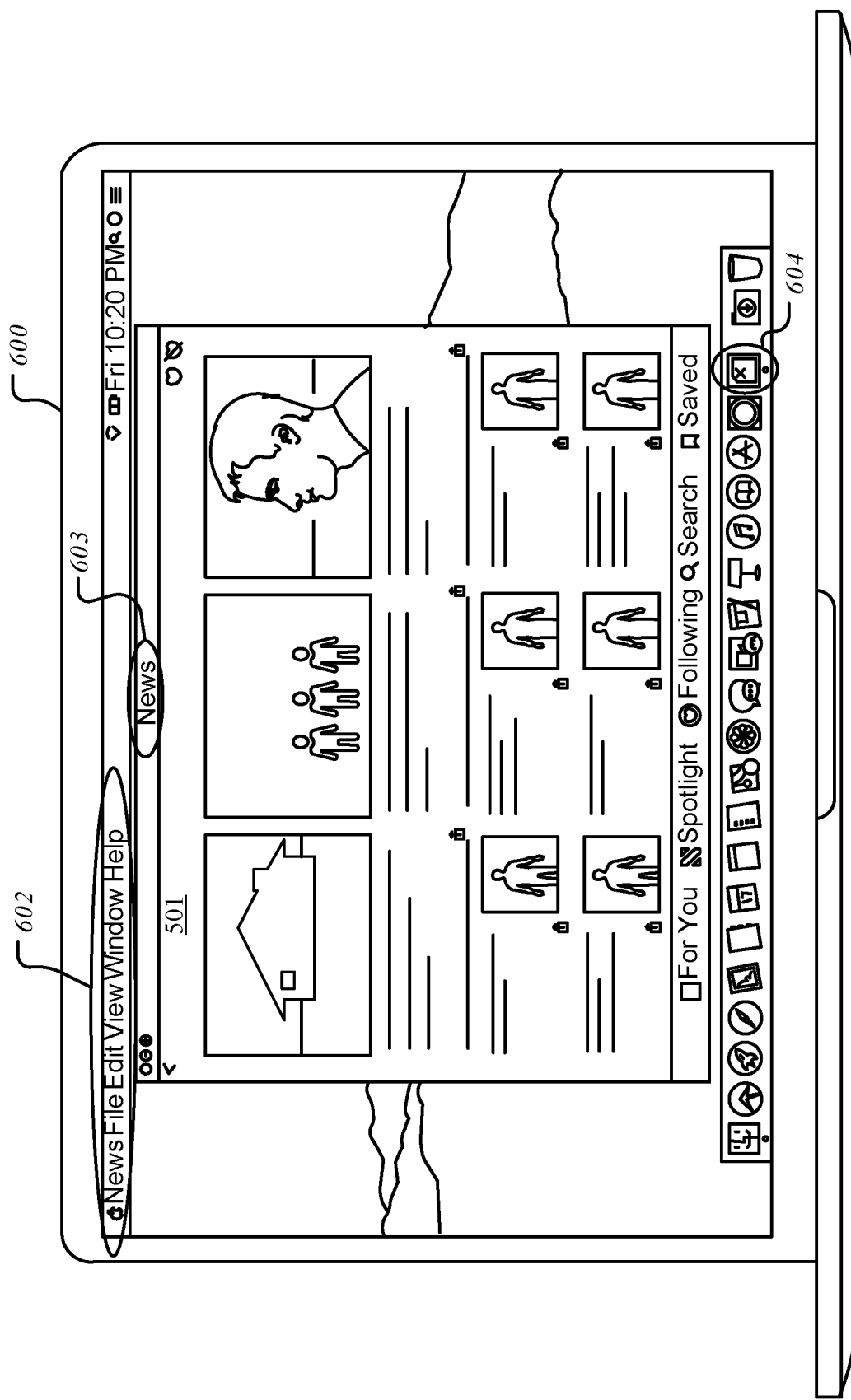

FIG. 6 illustrates execution of a mobile application on a host platform 600, according to an embodiment. The host platform 600 can be a laptop or desktop computing device on which a laptop or desktop operating system can execute. In one embodiment, when the mobile application 501 executes on the host platform 600, the graphical interface elements of the mobile application are translated into graphical interface elements provided by the graphical framework of the host platform 600. For example, graphical interface elements including, but not limited to a menu 602, window title 603, and dock icon 604 can be automatically generated and displayed for the mobile application 501 during execution on the host platform 600. The graphical interface elements can be generated based on data the core program code of the mobile application 501 provides to a version of the mobile UI framework compiled for execution on the host platform 600. The mobile UI framework on the host platform 600 can relay data to the host platform UI framework to enable the display of graphical UI elements.

Figure 7A:
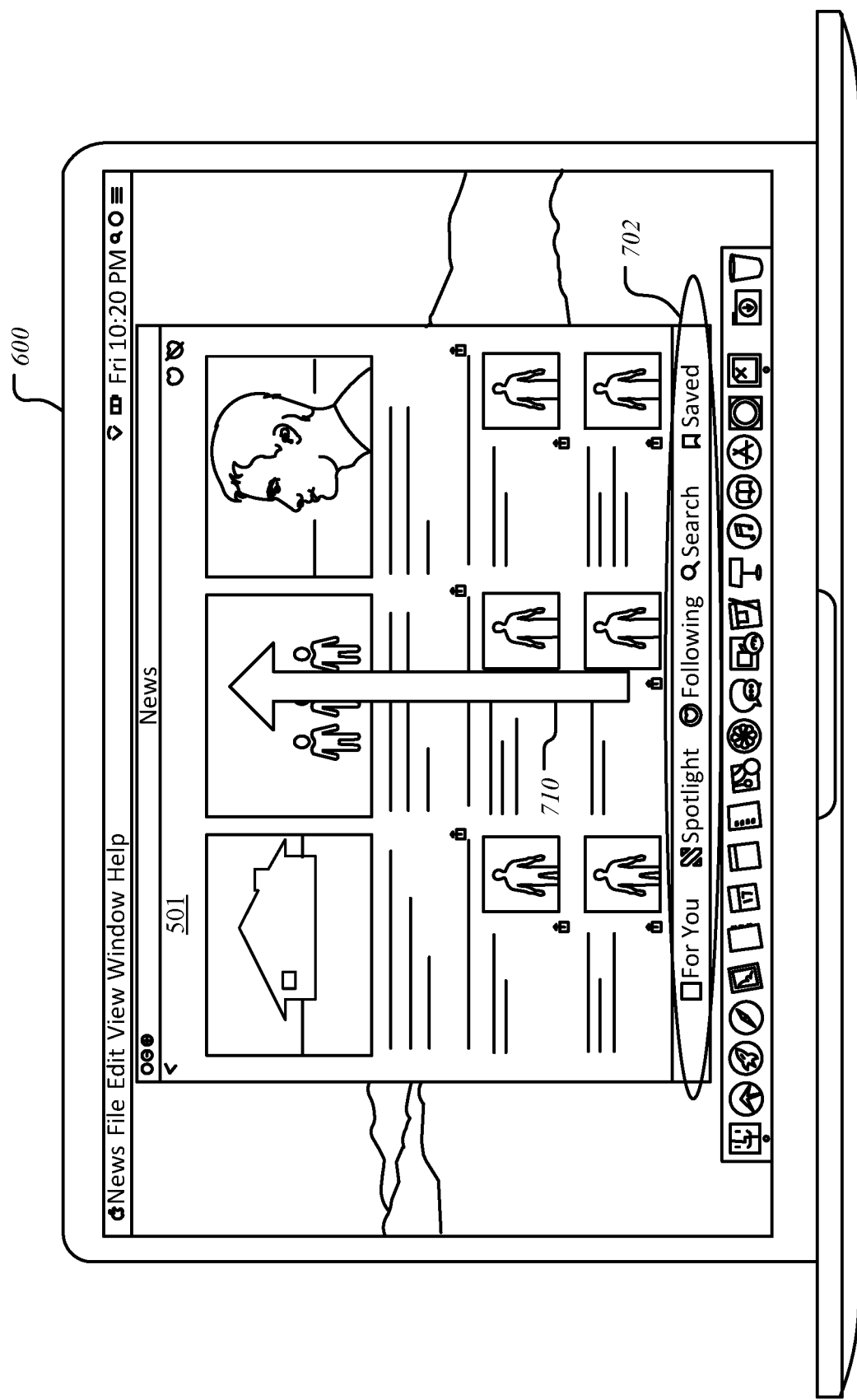
Figure 7B:
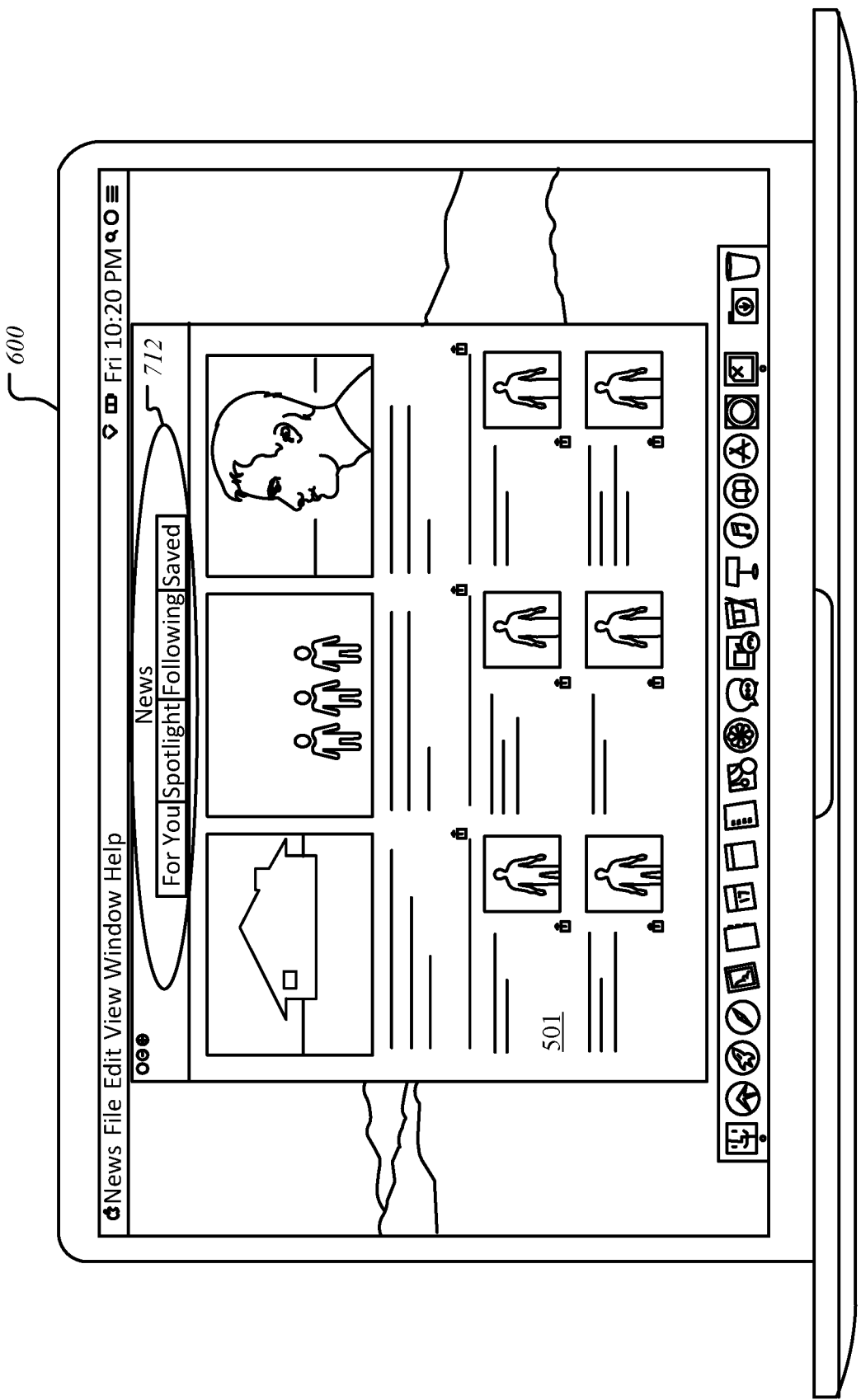

FIG. 7A-7B illustrates translation of mobile graphical elements into graphical elements of the host platform 600, according to an embodiment. In one embodiment, some graphical elements that are produced by the mobile UI framework are automatically translated into a graphical element provided by the host UI framework. For example, an API call from the core program code of the mobile application 501 to the mobile UI framework would generate graphical element 702 shown in FIG. 7A if executed on a mobile platform (e.g., mobile platform 500 as in FIG. 5). Graphical element 702 of FIG. 7A can be translated 710 to graphical element 712 shown in FIG. 7B.

Figure 8A:
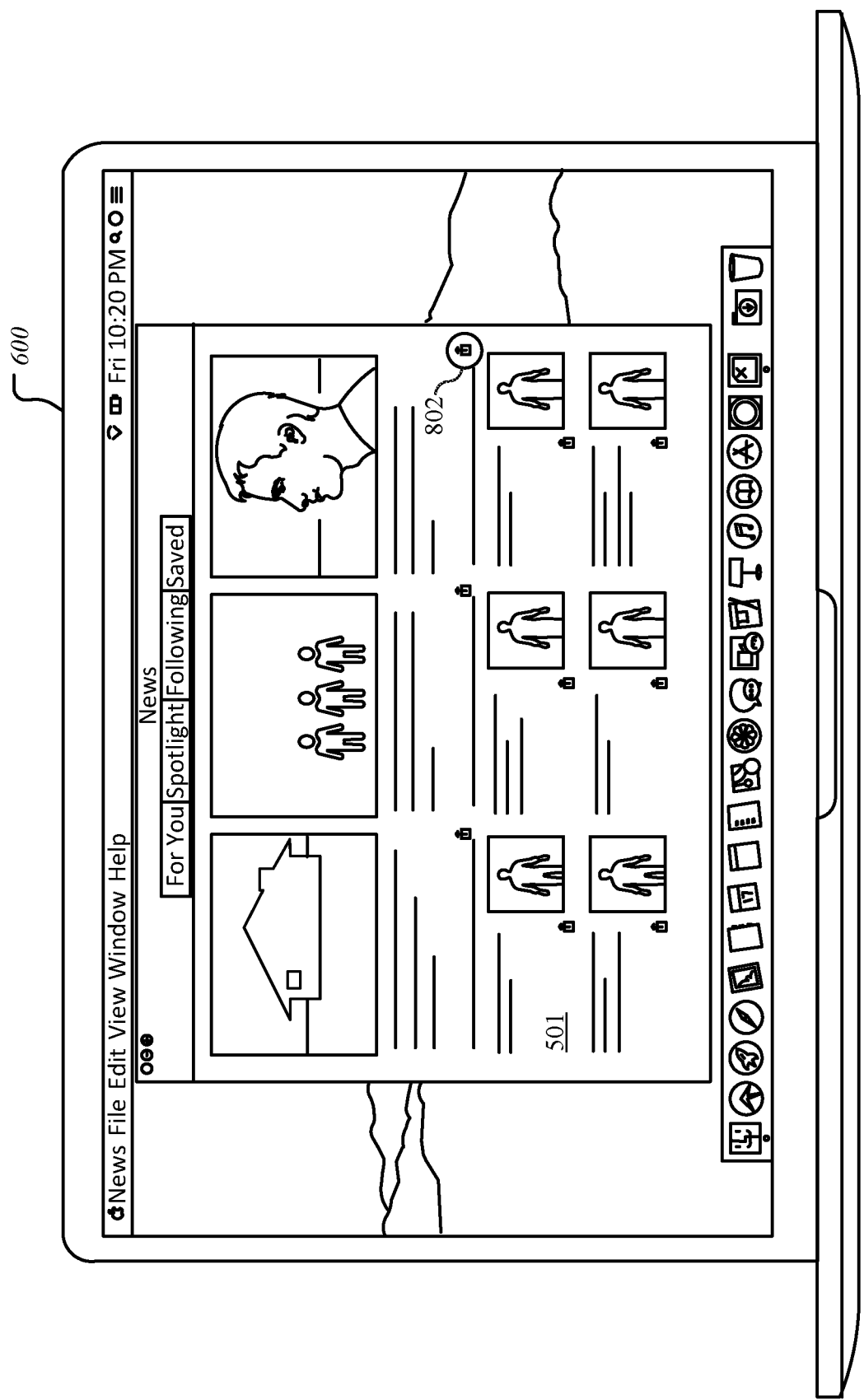
Figure 8B:
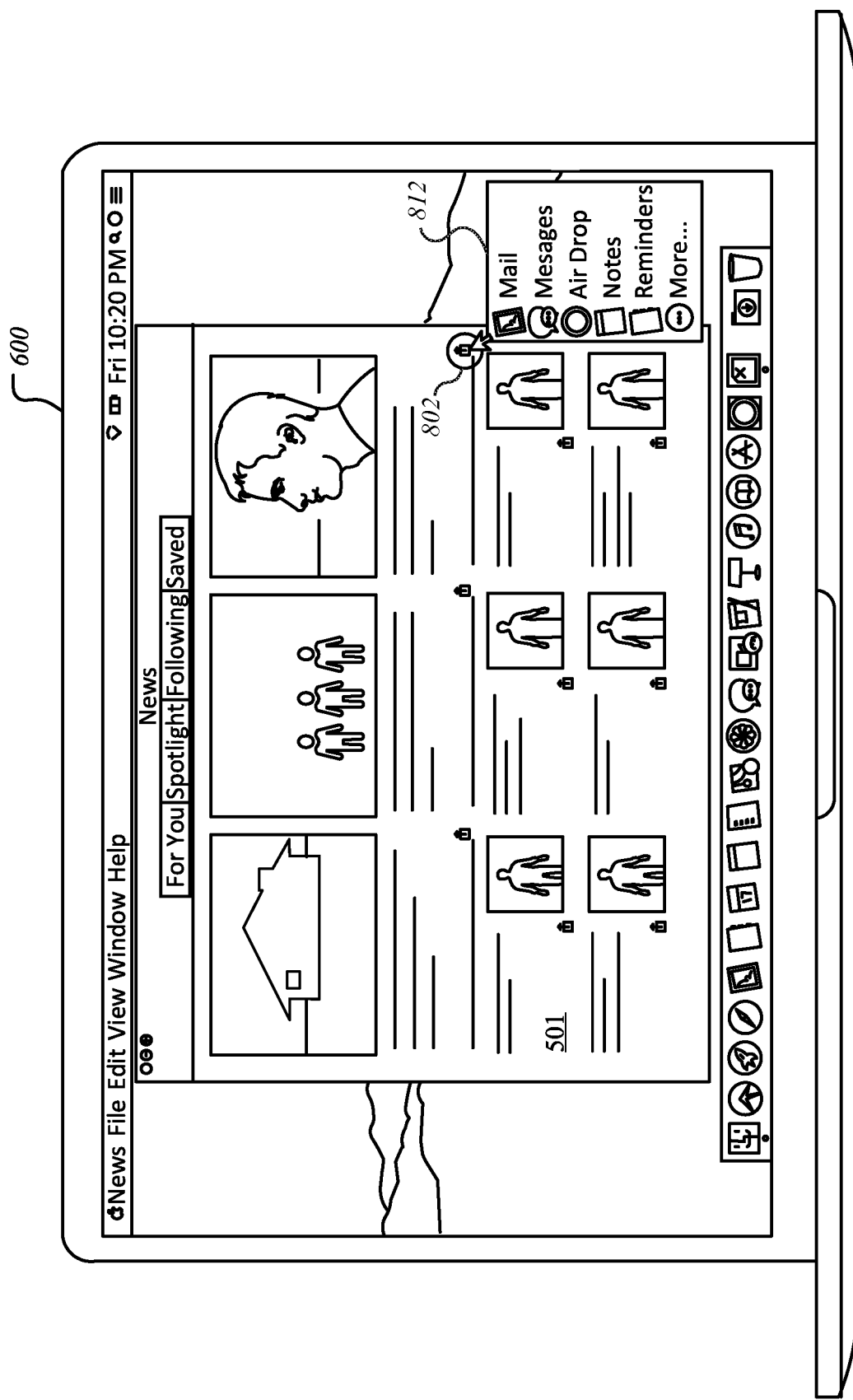

FIG. 8A-8B illustrates the handling of mobile UI framework features by the host platform 600. In one embodiment, graphical element 802 (e.g., a share icon) shown in FIG. 8A, upon interaction, can present graphical element 812, which is a share menu presented in the style of a menu provided by the host UI framework, as shown in FIG. 8B.

Figure 9A:
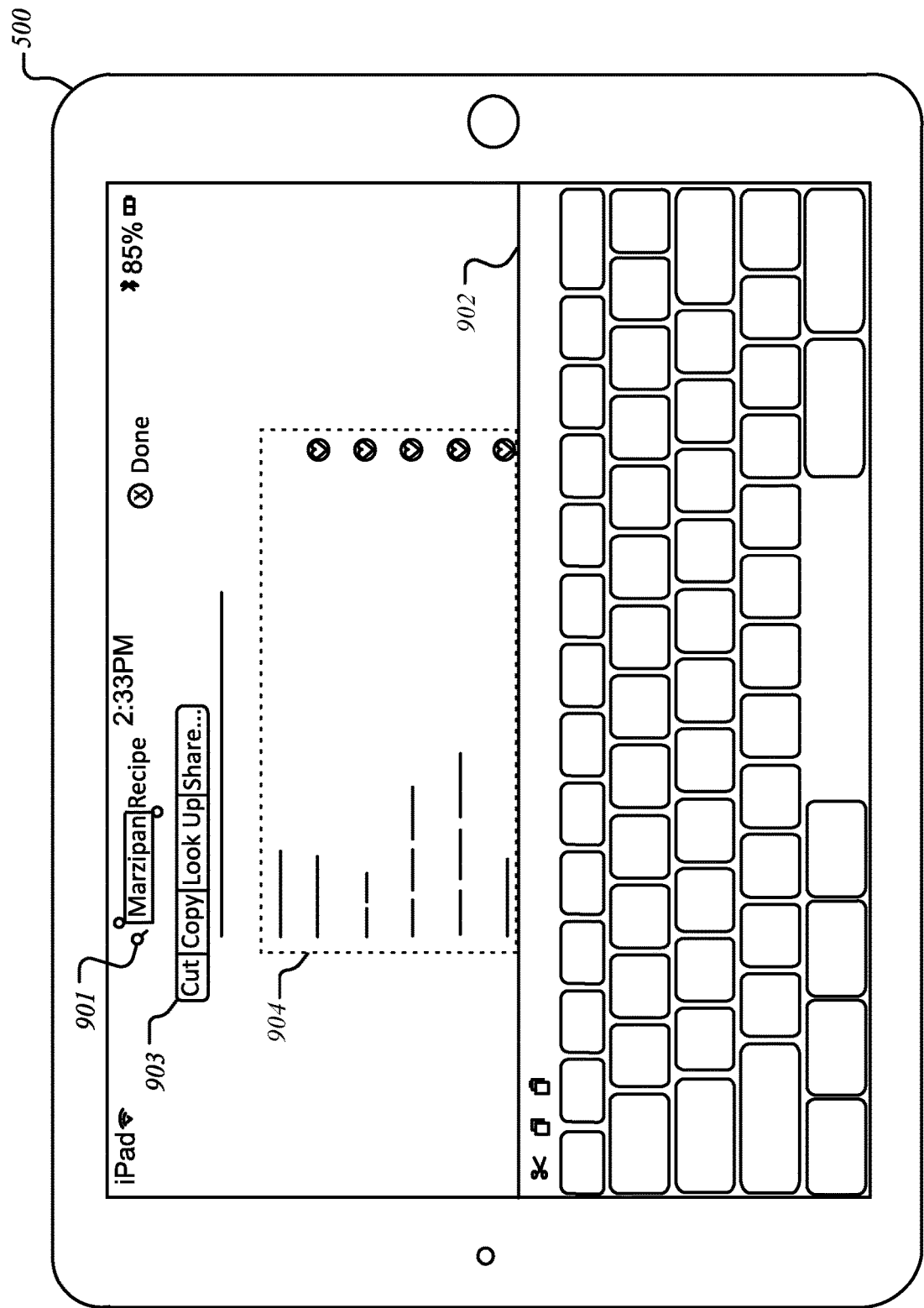
Figure 9B:
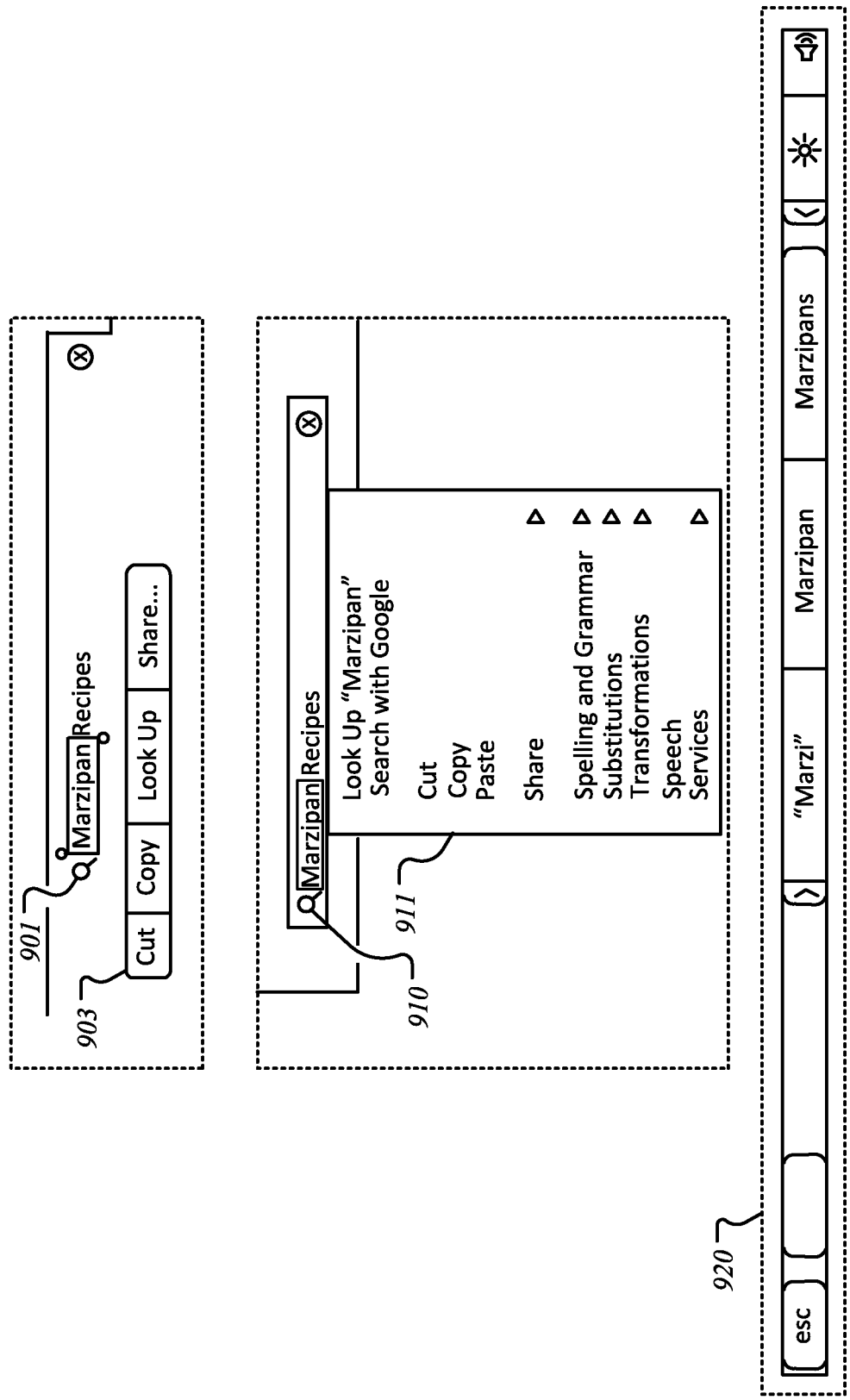

FIG. 9A-9B illustrates translation of a search bar 901 on a mobile platform into a search bar 910 for a host platform, according to an embodiment. As shown in FIG. 9A, a mobile platform 500 can display a mobile application having a search bar 901. A user can type a search term into the search bar 901 using a software keyboard 902 provided by the mobile platform 500. In response to typing the search term into the search bar 901, a set of results 904 can be displayed. In response to one or more touch interactions with text in the search bar, graphical element 903 is displayed which provides options to perform cut, copy, look up, or share operations using selected text.

As shown in FIG. 9B, similar functionality for the mobile application is maintained when the application is executed on a host platform. The search bar 901 and graphical element 903 is automatically translated at runtime to search bar 910 and graphical element 911, which enables interaction options available to other applications executing on the host platform, including cut, copy, look up, and share options, as well as other options that are presented to host platform applications.

In one embodiment, where supplemental hardware features are available on the host platform, such as a touch bar 920, those supplemental hardware features are also available to mobile applications executing on the host platform.

Integrated Inter-Process Communication Framework

Returning to FIG. 2, the IPC link 223 shown in FIG. 2 allows a content process 230 of a ported mobile application to communicate with a host process 220 that enables the display of UI elements using the host UI framework 225. A communication connection can be established using existing inter-process communication techniques as shown in FIG. 10.

Figure 10:
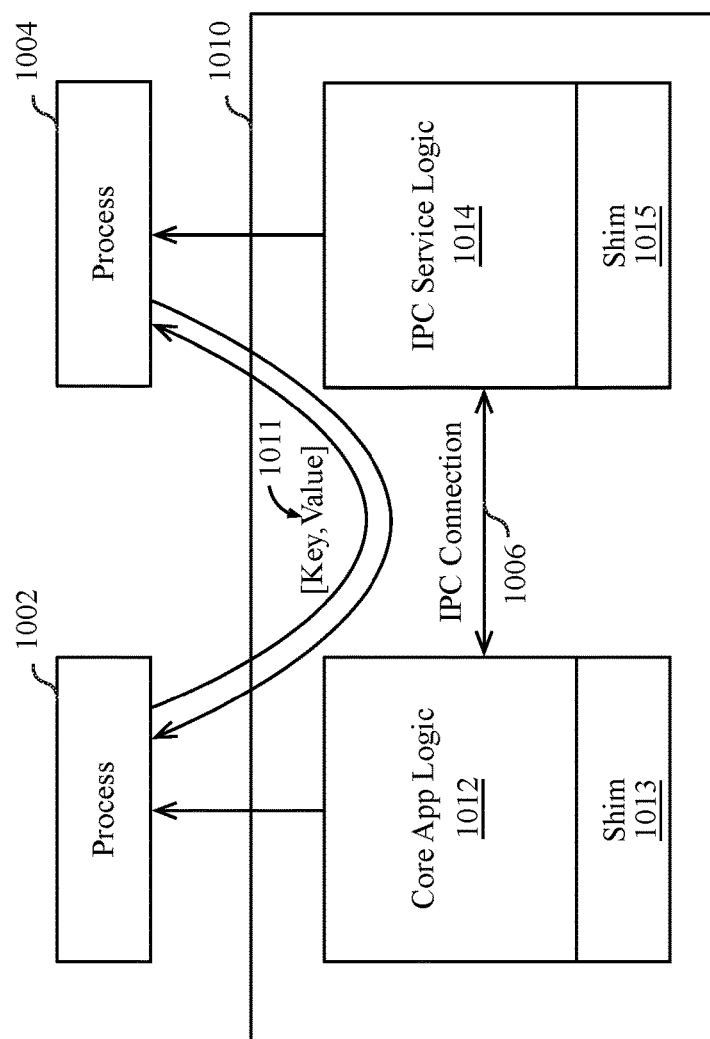
FIG. 10 illustrates an exemplary inter-process communication system.

FIG. 10 illustrates an exemplary inter-process communication system 1000. The inter-process communication system 1000 enables the building of an application package 1010 that contains core application logic 1012 and inter-process communication service logic 1014. The IPC service logic 1014 is a helper tool that can be used to perform work on behalf of the core application logic 1012 to facilitate communication with other processes executing on the system. The IPC service logic 1014 is managed by a launcher daemon on the system. The launcher daemon can launch, restart, and terminate a process 1004 associated with the IPC service logic 1014. Process 1004 is launched in response to the launch of process 1002 associated with the core application logic 1012. Functionality can be divided between the core application logic 1012 and the IPC service logic 1014. Process 1002 associated with the core application logic 1012 and process 1004 associated with the IPC service logic 1014 can exchange key-value data 1011 over a system managed IPC connection 1006. To enable a multi-process system as shown in FIG. 2 in which a content process 230 communicates over an IPC link 223 with a host process 220 using the inter-process communication system 1000 as in FIG. 10, a set of shims can be used to translate between the UI frameworks. For example, shim 1013 translates functionality provided by, for example, a mobile UI framework (e.g., mobile UI framework 235 as in FIG. 2) into key-value data 1011, which is then relayed over the IPC connection 1006 and translated into functionality that can be implemented using a host UI framework (e.g., host UI framework 225 as in FIG. 2). However, the types of data that can be relayed over the IPC connection 1006 is limited and the implementation of the shims 1013, 1015 may be time consuming and complex.

Embodiments described herein can provide an integrated inter-process communication framework that enables inter-process program logic while abstracting the details of the inter-process communication channel. In one embodiment, the integrated inter-process communication framework provides a build time and run time framework that allows transparent implementation of a shared inter-process communication protocol. The integrated inter-process communication framework also enables processes using different runtimes to communicate over programming interfaces without regard to binary interface differences between the runtimes. Accordingly, cross-process workloads can be performed using multiple runtime libraries that may not be ABI compatible, as ABI differences can be resolved transparently at the IPC interface.

Figure 11A:
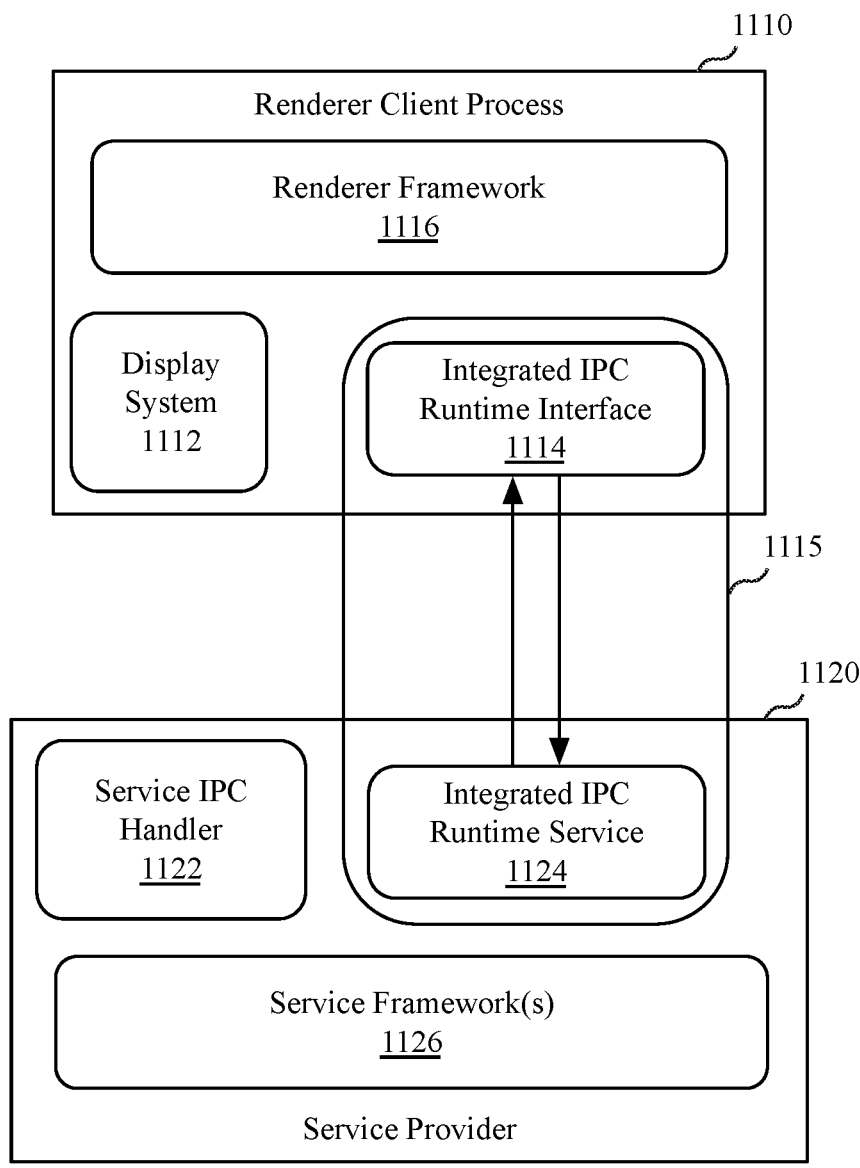
FIG. 11A-11C illustrates a system in which an integrated IPC runtime enables cooperative rendering, according to an embodiment.
Figure 11B:
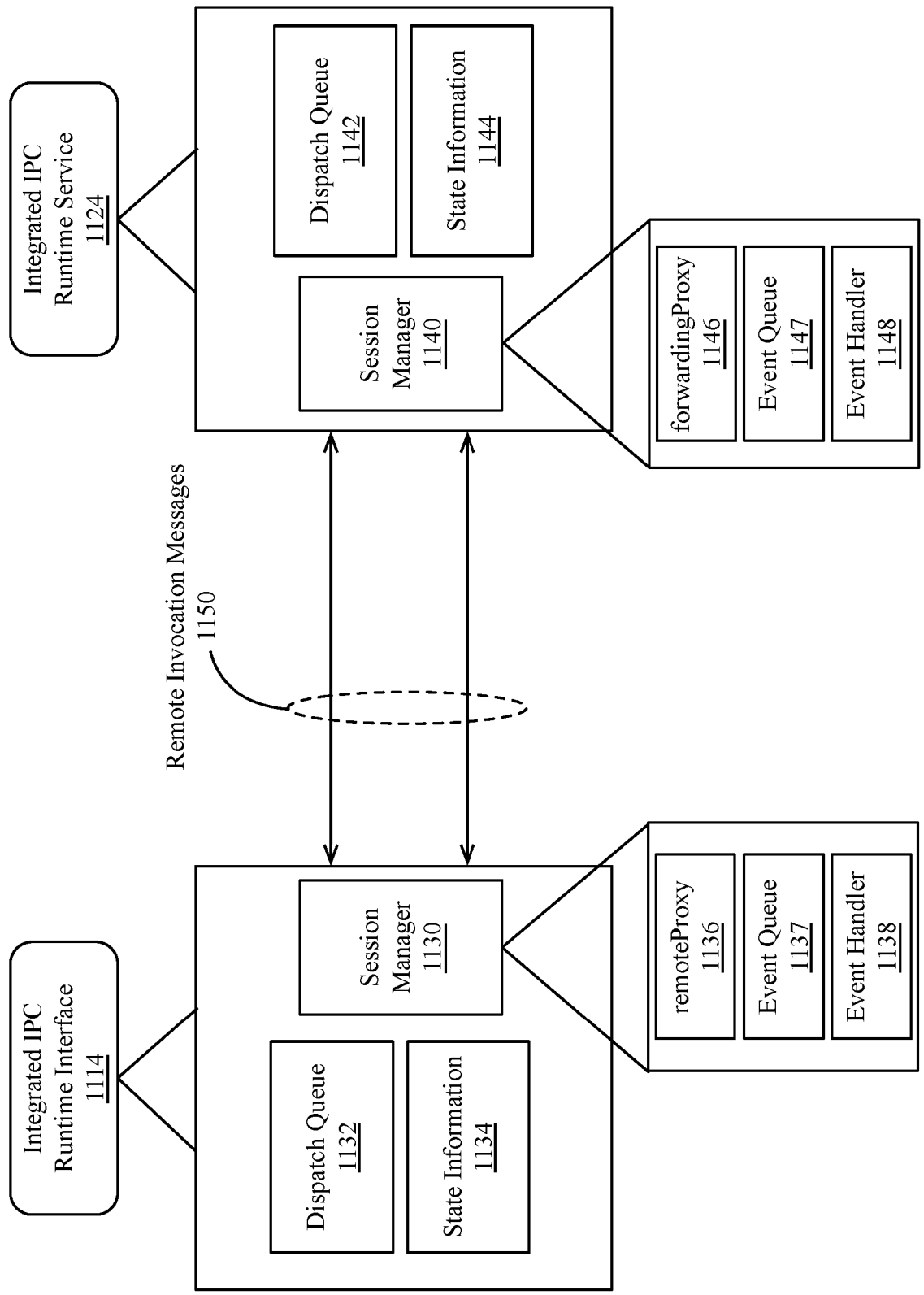

FIG. 11A-11B illustrates a system 1100 in which an integrated IPC runtime 1115 enables cooperative rendering, according to an embodiment. As shown in FIG. 11A, in one embodiment the system 1100 includes a renderer client process 1110 and a service provider 1120, which are programmatically connected via an implementation of the integrated IPC runtime 1115. The renderer client process can provide rendering functionality for a process via a display system 1112 of the platform. In one embodiment the renderer client process 1110 can access functionality provided by a renderer framework 1116. The renderer framework 1116 can enable the renderer client process 1110 to generate and manipulate graphical elements for display via the display system 1112. The service provider 1120 can provide content that is rendered by the renderer client process 1110. The service provider 1120 can generate content using functionality provided by one or more service framework(s) 1126. A service IPC handler 1122 of the service provider 1120 can assist the integrated IPC runtime 1115 in creating the IPC channel over which data flows between the renderer client process 1110 and the service provider 1120. The specific details of the IPC channel of the IPC runtime 1115 can vary based on the type of inter-process communication channel being used, with different IPC channels configurable via the use of different instances of the service IPC handler 1122. In one embodiment, the IPC channel is an XPC channel, although other IPC technologies are used in other embodiments.

In one embodiment the integrated IPC runtime 1115 is implemented via the use of a plug-in model. A plugin to enable an integrated IPC runtime interface 1114 is included in the renderer client process 1110, while an integrated IPC runtime service 1124 is included in the service provider 1120. A bi-directional communication channel can be created at runtime via the integrated IPC runtime 1115 to enable communication between the renderer client process 1110 and the service provider 1120. The implementation details of the bi-directional communication channel can be abstracted way from the renderer client process 1110 and the service provider 1120. Instead, each process can access functionality provided by the other process as though the processes were corresponding runtime libraries. Functions, classes, methods, and other functionality within the service provider 1120 can be called by the renderer client process 1110. Functionality within the renderer client process 1110 can be called by the service provider 1120. Data and state information to enable cross-process functionality can be relayed over the integrated IPC runtime 1115 between the integrated IPC runtime interface 1114 and the integrated IPC runtime service 1124.

The illustrated system 1100 of FIG. 11A can be used to implement a variety of cross-process functionality. In some embodiments, it is beneficial to divide program functionality across multiple processes, such that the privilege level of each process can be narrowly tailored to the needs of the process, enabling better implementation of the principle of least privilege. Additionally, a multi-process model is more resilient to crashes. For example, if the renderer client process 1110 were to fail, that process can be immediately restarted by the system without negative impact to the service provider. The use of the integrated IPC runtime 1115 can allow communication between such processes to be performed in a more robust manner, enabling full-featured programming language functionality and interoperability between the processes.

In one embodiment, the integrated IPC runtime 1115 can enable accelerated graphics and compute functionality within a simulator environment. For example, where a simulator running on a host platform is used to enable the development of software for other platforms, such as a mobile platform, hardware acceleration of display and/or 3D graphics functionality may be limited. Enabling hardware acceleration of such functionality may require extensive use of shim or translation layers that may be difficult and time consuming to implement. In one embodiment, the integrated IPC runtime 1115 plugins can be used to extend graphical user interface (GUI) and 3D acceleration provided by the host platform to applications executing in a simulated environment by configuring a link between a simulator application and a renderer service provider having access to a GUI or 3D acceleration framework. 3D or GUI function calls to the GUI or 3D accelerator framework can be transparently relayed over the IPC channel of the integrated IPC runtime 1115. Furthermore, the integrated IPC runtime 1115 can be used to enable the multi-process model to support ported applications as described herein. In one embodiment the integrated IPC runtime 1115 can also be used for accelerated multimedia (audio and video playback) and to enable control input from joysticks, game controllers, and the like.

FIG. 11B illustrates elements of the integrated IPC runtime 1115, according to one embodiment. In one embodiment, remote invocation messages 1150 are sent between the integrated IPC runtime interface 1114 and the integrated IPC runtime service 1124 using an inter-process communication channel as a transport medium. The remote invocation messages 1150 enable the remote invocation of methods and objects across processes using proxy execution state.

In one embodiment the IPC connection over which the remote invocation messages 1150 are transmitted is managed by session managers 1130, 1140 in each side of the connection. The session managers 1130, 1140 can create an IPC connection, configure event queues 1137, 1147 and event handlers 1138, and establish proxy connections for each plugin (e.g., remote proxy 1136, forwarding proxy 1146). The session managers 1130, 1140 can send and receive remote invocation messages 1150 and directly perform operations based on those messages or insert workloads into dispatch queues 1132, 1142. Remote proxies of objects can be invoked programmatically as through the remote proxy were local. In one embodiment, dispatch queue 1132 and dispatch queue 1142 can represent proxy views of the same logical queue, where the logical queue has state information that is reflected via state information 1134, 1144 at each endpoint. In one embodiment, state information 1134, 1144 includes local execution state and proxy state for remote invocations.

In one embodiment, cross-process functionality can be performed via the use of dispatch queues that can be used to exchange self-contained blocks of functionality between processes. The IPC connection can be used to enable a dispatch queue 1132 within the integrated IPC runtime interface 1114 can exchange workload requests with a dispatch queue 1142 within the integrated IPC runtime service. State information 1134, 1134 associated with the dispatch queues 1132, 1142 can also be relayed over the IPC connection. In one embodiment, dispatch queues 1132, 1142 and state information 1134, 144, and other data associated with each end of the IPC connection are synchronized via proxies on each end of the IPC connection.

The IPC integrated IPC service interface 1114 and integrated IPC runtime service 1124 can be used to implement specific programming language functionality. In one embodiment, functionality provided by the Objective-C programming language or the Swift programming language can be enabled. For example, Objective-C blocks and Swift closures can be exchanged over the IPC connection as remote invocation messages 1150. Additionally, Swift completion handlers can also be used to provided program logic that can automatically run after the completion of other requested functionality. Objective-C and Swift are provided as example languages supported by one embodiment and the calling semantics of any programming language can be supported.

Figure 11C:
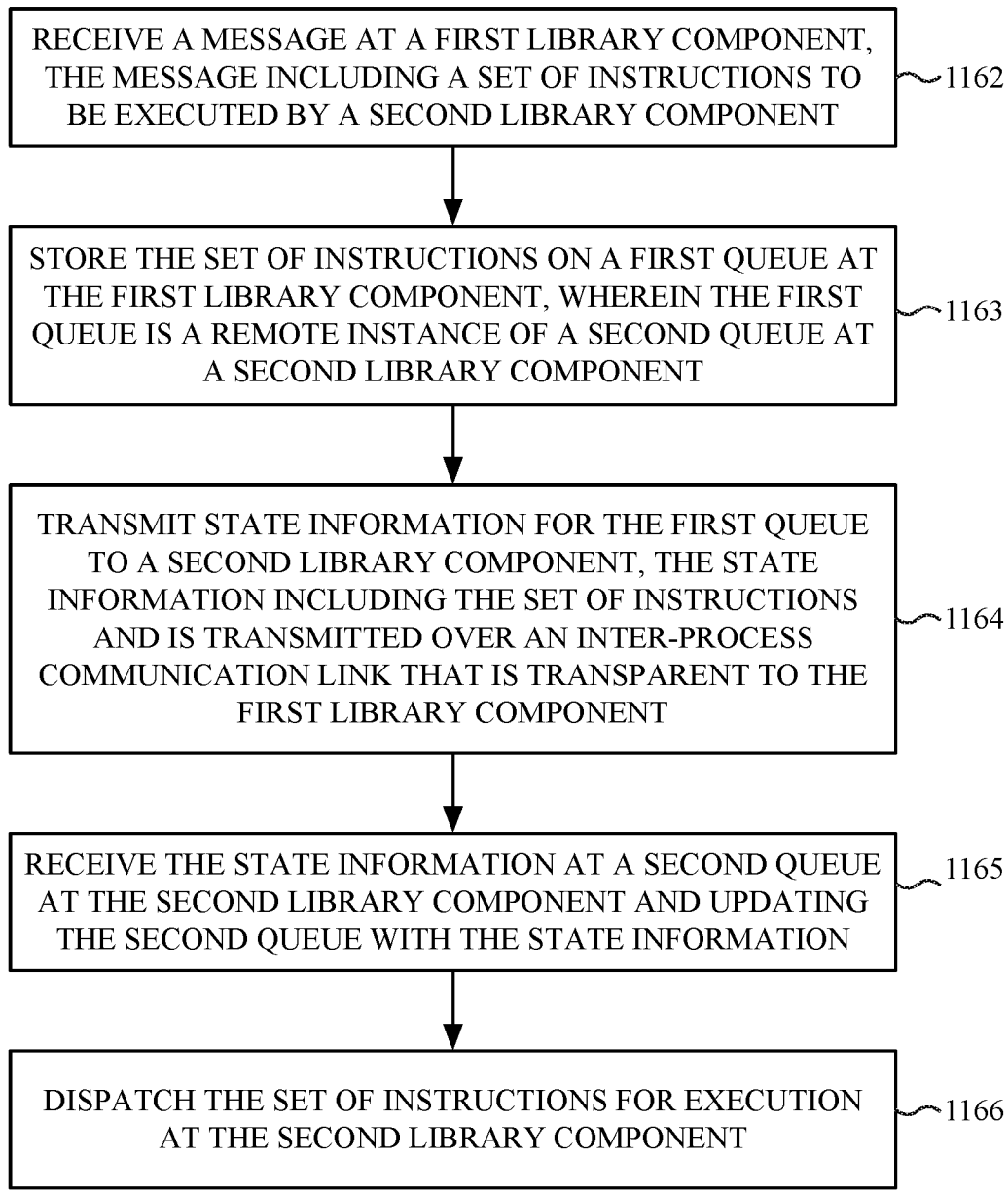

FIG. 11C is a method 1160 for relaying programmatic functionality between processes, according to an embodiment. The method 1160 can be implemented by a processor of a computing system based on instructions provided by the integrated IPC runtime described herein. The method 1160 enables a block of instructions, or other commands, to be relayed by a client for implementation at a server. In one embodiment, the method 1160 is performed to enable remote invocation of messages as shown in FIG. 11B.

In one embodiment, the method 1160 includes to receive a message at a first library component, the message including a set of instructions to be executed by a second library component, as shown at block 1162. The method 1160 additionally includes to store the set of instructions on a first queue at the first library component, wherein the first queue is a remote instance of a second queue at a second library component, as shown at block 1163. The method 1160 further includes to transmit state information for the first queue to a second library component, as shown at block 1164. The state information can include the set of instructions and can be transmitted over an inter-process communication link that is transparent to the first library component. The method 1160 can additionally include to receive the state information at a second queue at the second library component and updating the second queue with the state information, as shown at block 1165. The method 1160 can then dispatch the set of instructions for execution at the second library component, as shown at block 1166.

Figure 12A:
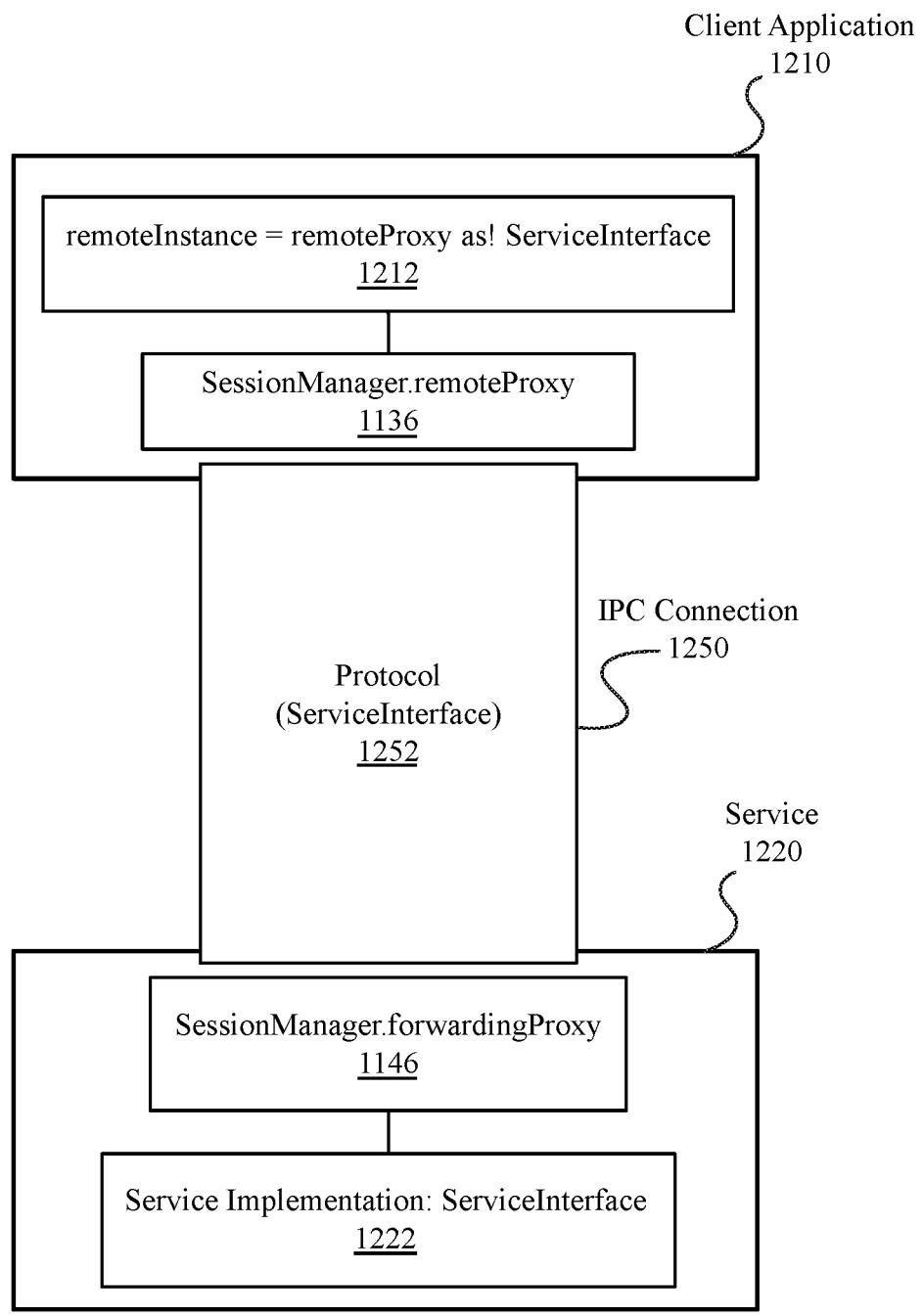
FIG. 12A-12B illustrate remote invocation of service functionality at a client application, according to an embodiment.

FIG. 12A is a block diagram of program logic to enable remote invocation of service functionality at a client application, according to an embodiment. In one embodiment, a client application 1210 can remotely invoke functionality provided by a service 1220 over a protocol 1252. The protocol 1252 can be used to define functionality that will be remotely accessible to the client application 1210 over the IPC connection 1250. The forwarding proxy 1146 links the protocol 1252 with the service implementation 1222. The service implementation 1222 implements the underlying functionality that is accessed by the client application 1210. The remote proxy 1136 in the client application 1210 links the protocol 1252 with the remote instance 1212 of the service functionality that is accessed by the client application 1210. The program logic of the client application 1210 can create a remote instance 1212 of the service functionality by converting the remote proxy 1136 to the data type of the service interface exposed via the protocol 1252 and the forwarding proxy 1146 within the service 1220. The remote instance can then be invoked in the same manner as the service implementation 1222 within the service 1220.

In one embodiment, the remote implementation models for objects can vary, and objects can be implemented remotely across processes using one of multiple models. In one embodiment an object can be snapshotted, such that a persistent view of the object can be sent across the IPC connection 1250 when the object is remotely accessed. In one embodiment an object can be impersonated, such that an opaque identifier (e.g., UUID, integer) can be used to represent a conceptual object on each side of the IPC connection 1250. Programming interfaces can reference the opaque identifier to explicitly select an object to access. Impersonation can be used to remotely present an entire class interface. If a class implements a protocol and the protocol is implemented over the interface, remote function calls can be made that automatically traverse the IPC connection 1250. In one embodiment, objects can be configured to perform custom serialization and deserialization of data on that traverses the IPC connection 1250, which allows the streaming of data over the IPC connection 1250. In one embodiment, objects can be configured that can interpose program logic before data is transmitted over the IPC connection 1250, which can be used to enable special handling of data or function calls. For example, if a group of asynchronous messages are to be transmitted over the IPC connection, interposing program logic can be configured that bundles the asynchronous messages before transmission. In one embodiment, interposing logic can be configured as part of the protocol 1252 which relays data over the IPC connection 1250. Interposing logic can be of particular use to the client application 1210, which use an interposer to intercept and adapt any function call made by the client application 1210 to the service implementation 1222.

Figure 12B:
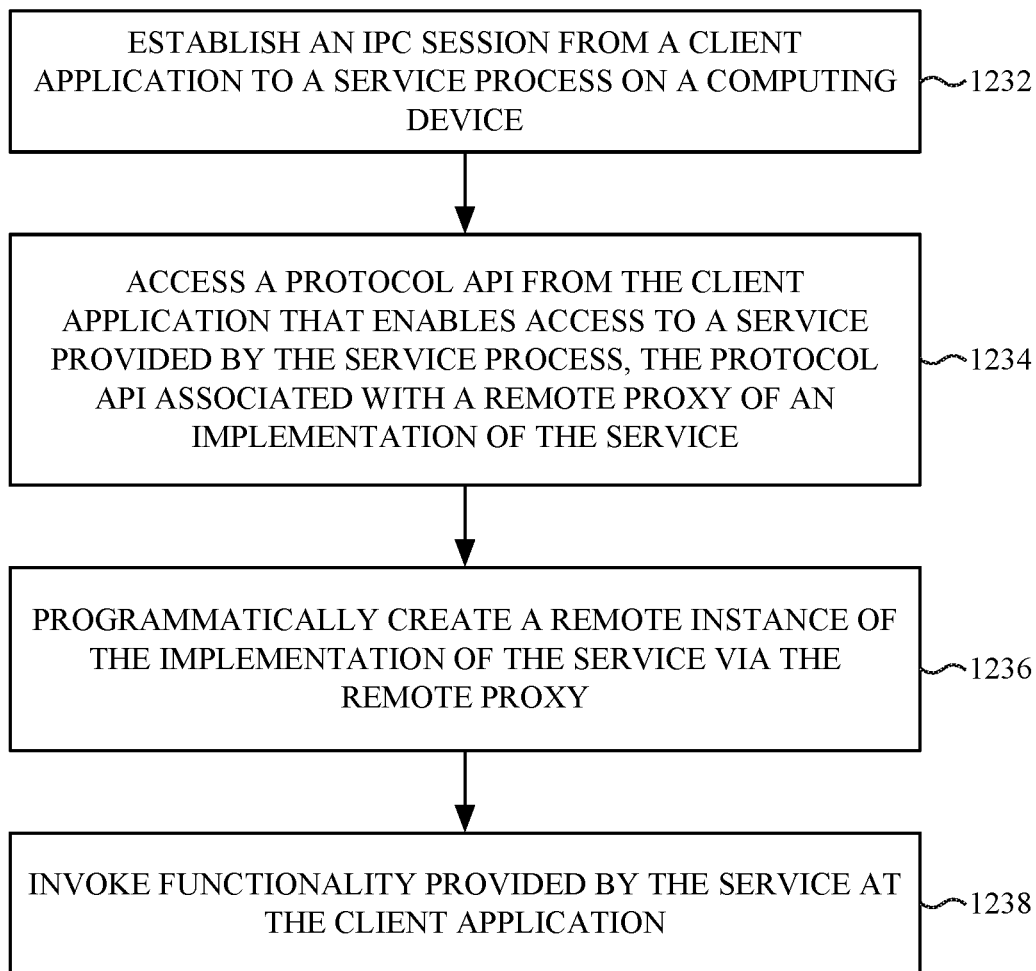

FIG. 12B is a method 1230 remotely invoking programmatic functionality between processes, according to an embodiment. The method 1230 can be implemented by a processor of a computing system based on instructions provided by the integrated IPC runtime described herein. The method 1230 enables an object provided by a service module to be remotely invoked by a client application as though the object is a local object.

As shown at block 1232, the method 1230 can establish an IPC session from a client application to a service process on a computing device. As shown at block 1234, the method 1230 can access a protocol API from the client application that enables access to a service provided by the service process, the protocol API associated with a remote proxy of an implementation of the service. At block 1236, the method 1230 can programmatically create a remote instance of the implementation of the service via the remote proxy to the implementation of the service. At block 1238, the method 1230 can invoke functionality provided by the service at the client application. Programmatic remote access to a variety of services can be enabled, including any data, function, or method within the service process.

The method 1230 of FIG. 12B can be used to enable the automatic translation and display by a host process of graphical elements that are generated by a content process, as illustrated in FIG. 2. For example, the content process 230 of a ported mobile application can establish the IPC link 223 and access functionality provided by the host process 220 via a variant of method 1400. One or more protocols can be established such that a function call based on object provided by the mobile UI framework 235 can be invoked by the content process 230 and the necessary adjustments to the parameters and data of the function call can be automatically performed and the parameters and data can be relayed over the IPC link 223 to be performed by the host process 220. The host process 220 can receive the adjusted parameters and data and call services enabled via the host UI framework 225 to present graphical elements of the content process 230 as though those graphical elements were native to the host platform.

Figure 13A:
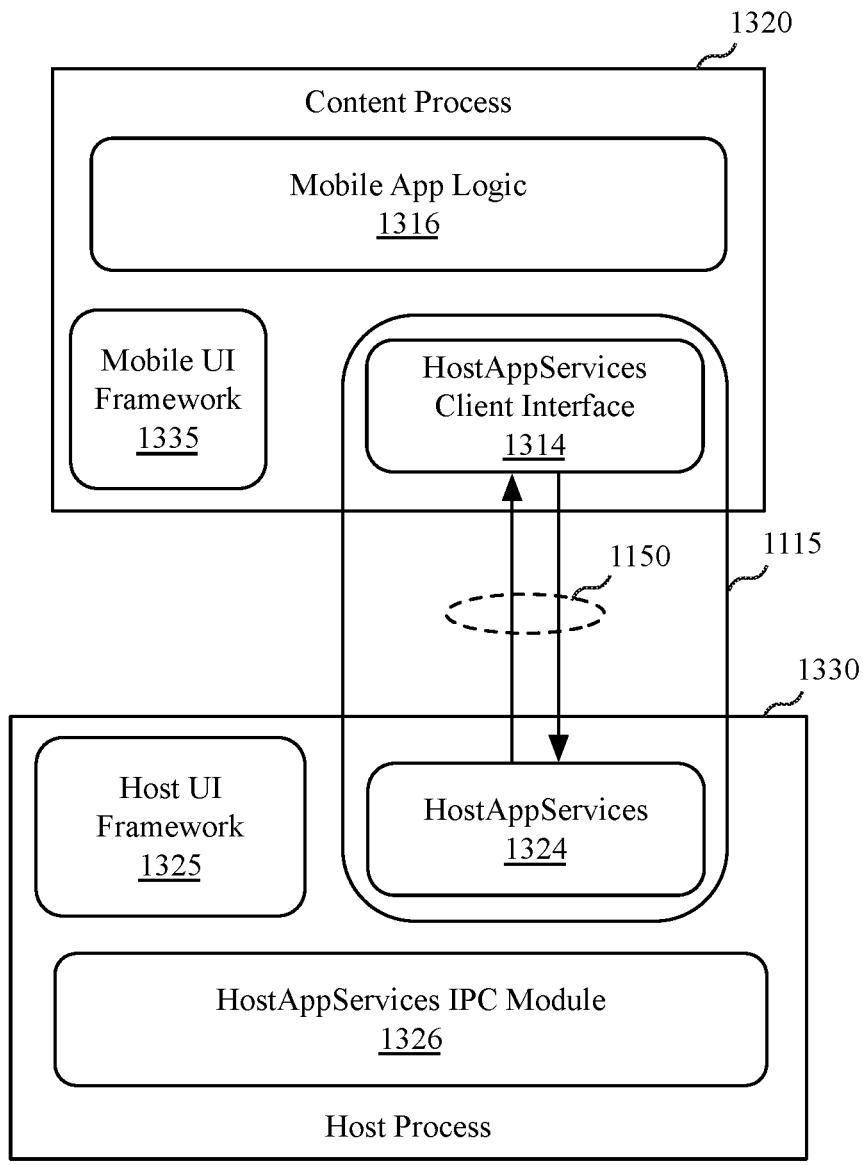
FIG. 13A-13C illustrate detailed views of multi-process applications, according to embodiments described herein.
Figure 13B:
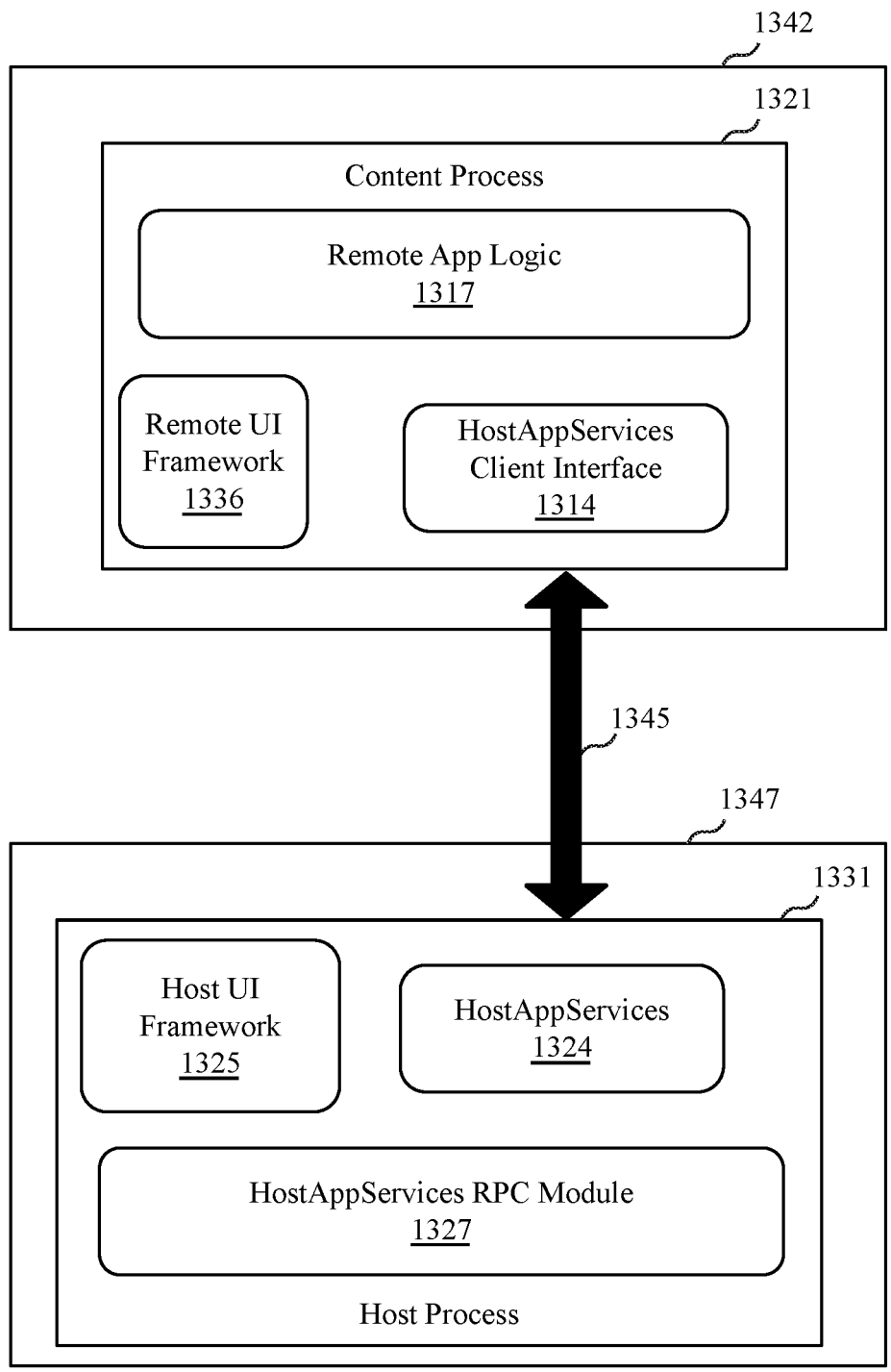
Figure 13C:
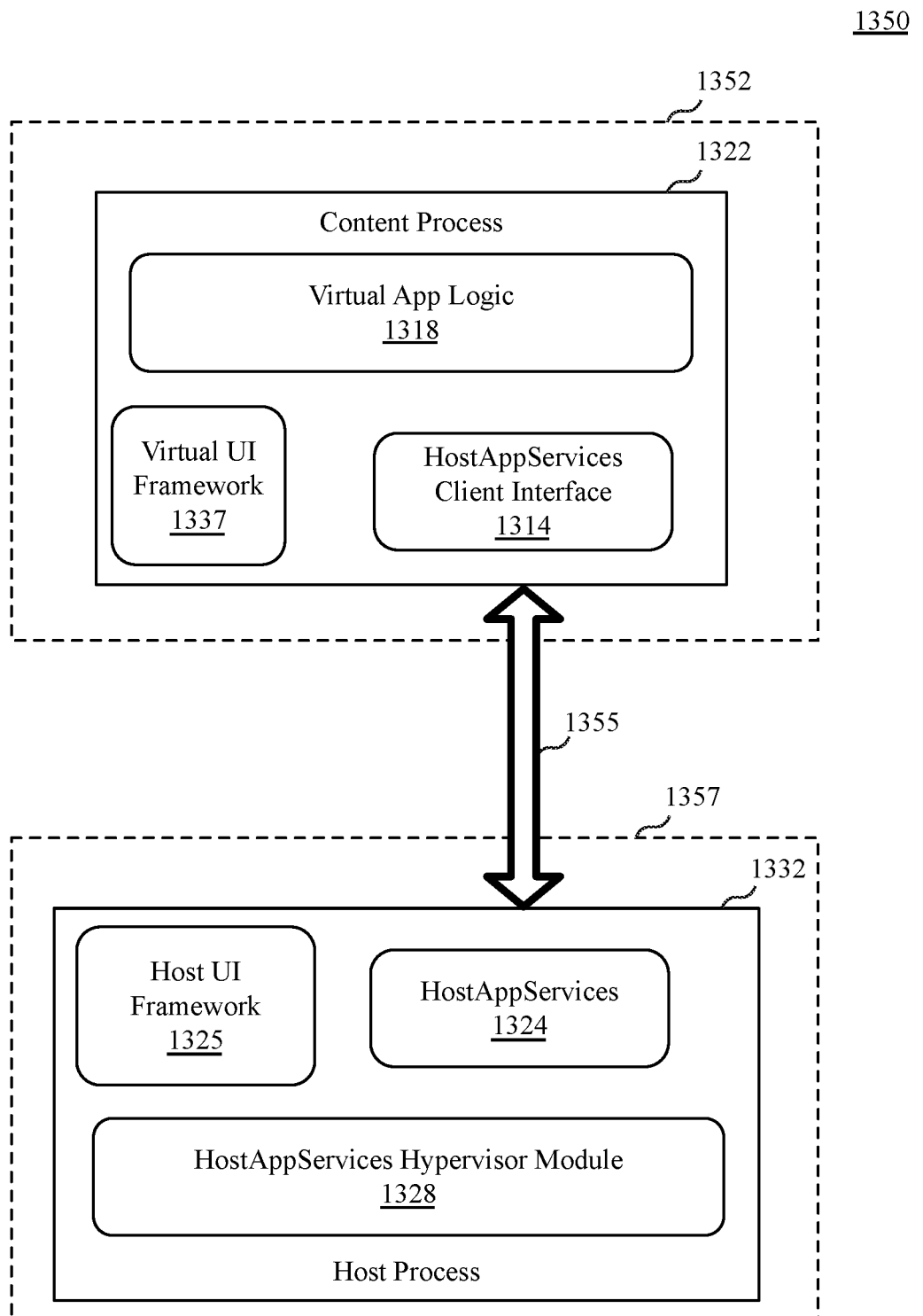

FIG. 13A-13C illustrate detailed views of multi-process applications 1300, 1340, 1350 according to embodiments described herein. FIG. 13A illustrates a multi-process application 1300 in which mobile application logic executes on a hosted platform. FIG. 13B illustrates a multi-process application 1340 in which a user interface is displayed for remotely executed application logic. FIG. 13C illustrates a multi-process application 1350 in which a virtual application displays a user interface on a host platform.

The multi-process application 1300 of FIG. 13A is a version of the multi-process application 201 shown in FIG. 2. In one embodiment the multi-process application 1300 includes a content process 1320 and a host process 1330, which are variants of the content process 220 and host process 230, which are programmatically connected via an implementation of the integrated IPC runtime 1115. The content process 1320 can generate content for display using encapsulated mobile application logic 1316, which is program code of a mobile application that can be compiled for execution on a mobile platform. The mobile application logic 1316 can generate content for display using logic provided by a mobile UI framework 1335. The logic of the mobile UI framework 1335 can be included by dynamically linking the mobile UI framework 225 of FIG. 2. The host process 1330 can display content created by the content process 1320 using logic provided by a host UI framework 1325. The logic of the host UI framework 1325 can be included by dynamically linking the host UI framework 235 of FIG. 2.

The integrated IPC runtime 1115 can be implemented with the support of a host application services IPC module 1326, which provides functionality used to set up an operate an IPC connection established by the integrated IPC runtime 1115. The specific details of the IPC channel of the IPC runtime 1115 can vary. For example, the host application services IPC module 1326 can enable the use of an XPC channel, although other IPC technologies can be used in other embodiments, and the techniques described herein are not limited to any one IPC implementation. Additionally, the IPC connection and underlying implementation is transparent to the mobile app logic 1316.

In one embodiment the host application services IPC module 1326 can translate function calls and data associated with the mobile UI framework 1334 into function calls and data that are compatible with the host UI framework 1325. The mobile application logic 1316 can function as though the logic is operating on a mobile platform. Calls via the mobile UI framework 1335 made by the mobile application logic can be relayed to and translated by the host application services IPC module. Those calls can then be performed by logic of the host UI framework 1325. The mobile app logic 1316 can send and receive remote invocation messages 1150 to the host process 1330 via a host application services client interface 1314, which is a plugin that implements the integrated IPC runtime interface 1114 as in FIG. 11. At the host process 1330, remote invocation messages 1150 can be sent and received by a host application services module 1324, which is a plugin that implements an integrated IPC runtime service 1124 as in FIG. 11.

The multi-process application 1300 can operate as a tiered system, with the integrated IPC runtime 1115 operating as an internal process communication tier, the UI framework communication and translation services interface enable communication between the mobile UI framework 1335 and the host UI framework 1325. The multiple process of the multi-process application 1300 can be bundled and executed on the host platform as though the application is entirely native to the host application platform.

The multi-process application 1340 of FIG. 13B uses techniques provided by embodiments described herein to enable local display of a user interface for remotely executed application logic. In one embodiment, multiple processes can operate in a distributed manner by relaying remote invocation messages over an integrated RPC runtime 1345, which is a variant of the integrated IPC runtime 1115 in which IPC calls are relayed over an RPC interface.

In one embodiment, remote application logic 1317 that is configured to operate via a remote UI framework 1336 can use the host application services client interface 1314 to remotely display a user interface. The remote application logic 1317 can execute as part of a content process 1321 that executes on a remote device 1342. The UI of the content process 1321 can be displayed on a host process 1331 that executes on a host device 1347. The remote application logic 1317 can use the integrated RPC runtime 1345 to invoke remote program logic in the same manner in which the program logic can, for example, invoke local dynamically linked program logic. The remote application logic 1317 can programmatically access functionality provided by the remote UI framework 1336 and the programming language semantics can be relayed via the integrated RPC runtime 1345 and executed by the host process 1331 using functionality provided via the host UI framework 1325. Functionality to enable the integrated RPC runtime 1345 to operate over the RPC connection can be provided via a host application services RPC module 1327. Any number of RPC protocols can be used to relay functionality. In one embodiment, the specific RPC protocol is determined based on the protocol enabled by the host application services RPC module 1327.

In one embodiment, the remote device 1342 can be the same type of platform or a different type of platform as the host device 1347. For example, the remote application logic 1317 can be mobile application logic developed for a mobile platform or can be host application logic that is developed for execution on a host platform, such as the host device 1347. While the remote application logic 1317 executes on the remote device 1342, the instructions to display the UI for such application are executed by the host device. Accordingly, the UI displayed in response to operations performed by the remote application logic 1317 is rendered by the host device 1347 and can appear identical to the UI of an application executed entirely on the host device 1347.

In one embodiment, the integrated RPC runtime 1345 can be leveraged to enable a distributed version of the content process 1320 in which some operations of the content process 1321 are executed on a first instance of the remote device 1342 while other operations are executed on a second instance of the remote device 1342. Each remote instance of the content process 1321 can use the integrated RPC runtime 1345 to relay UI commands that are executed via the host UI framework 1325 on the host device 1347. For example, and in one embodiment, a cloud-based development environment can execute in a distributed manner across multiple cloud-based servers while the UI of such environment is rendered locally on the host device 1347.

The multi-process application 1350 of FIG. 13C uses techniques provided by embodiments described herein to enable an application executed within a virtual machine environment 1352 to render a user interface for the application using the host UI framework on a host platform 1357 that executes the virtual machine hypervisor. In one embodiment, virtual application logic 1318 that is configured to operate via a virtual UI framework 1337 can use the host application services client interface 1314 to display a user interface on the host platform 1357 on which the virtual machine environment 1352 operates. The UI of the content process 1322 can be displayed on a host process 1332 that executes on a host device 1357. The virtual application logic 1318 can use the integrated hyper-call runtime 1355 to invoke remote program logic in the same manner in which program logic can be invoked from a process of a different platform type or a remotely executed process. In one embodiment the virtual application logic 1318 can programmatically access functionality provided by the virtual UI framework 1337 and the programming language semantics can be relayed via the integrated hyper-call runtime 1355 and executed by the host process 1332 using functionality provided via the host UI framework 1325. Functionality to enable the integrated hyper-call runtime 1355 can be provided via a host application services hypervisor module 1327, which can enable support for relay of remote invocation messages to a hypervisor for the virtual machine environment 1352. The messages, once received at the hypervisor, can be translated and relayed to the host UI Framework 1325 via the host application services module 1324. The UI displayed in response to operations performed by the virtual application logic 1318 is rendered by the host platform 1357 and can appear identical to the UI of an application executed entirely on the host device 1357.

Figure 14A:
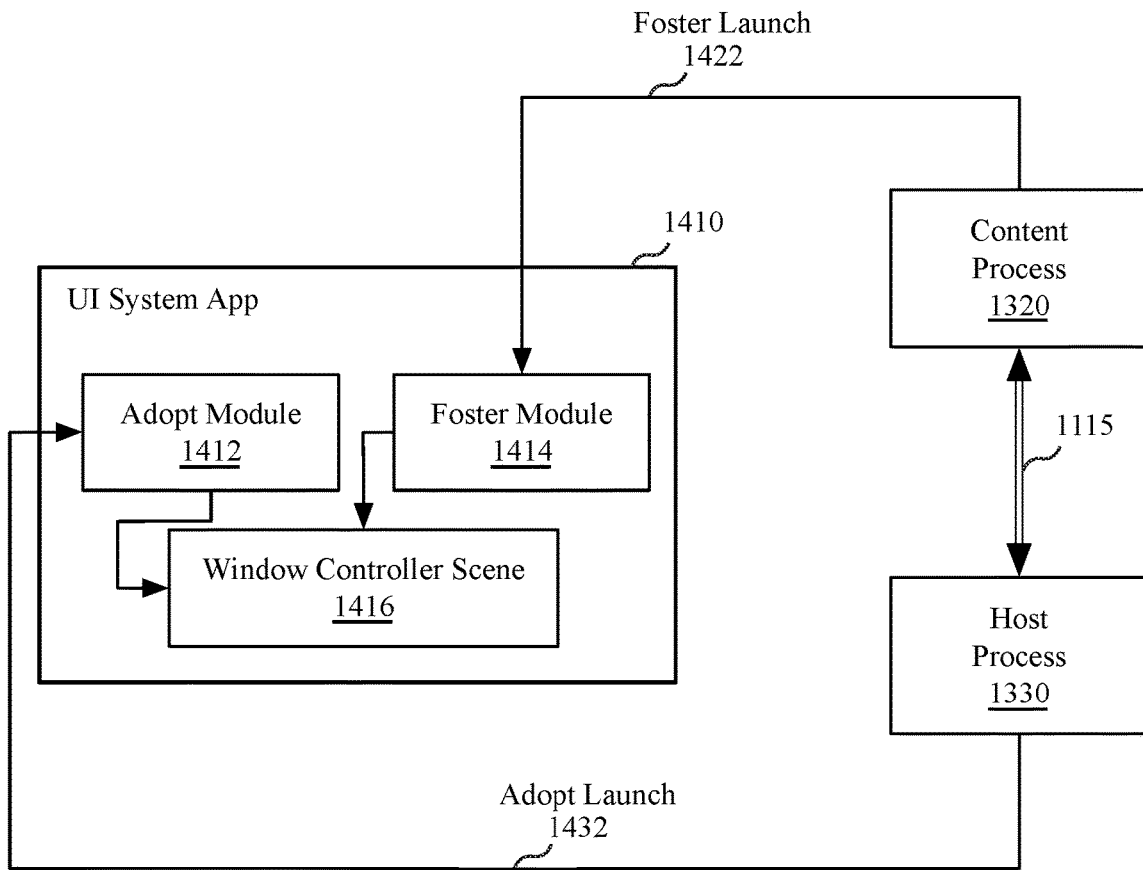
FIG. 14A-14B illustrates interaction between system services and a multi-process application, according to embodiments described herein.
Figure 14B:
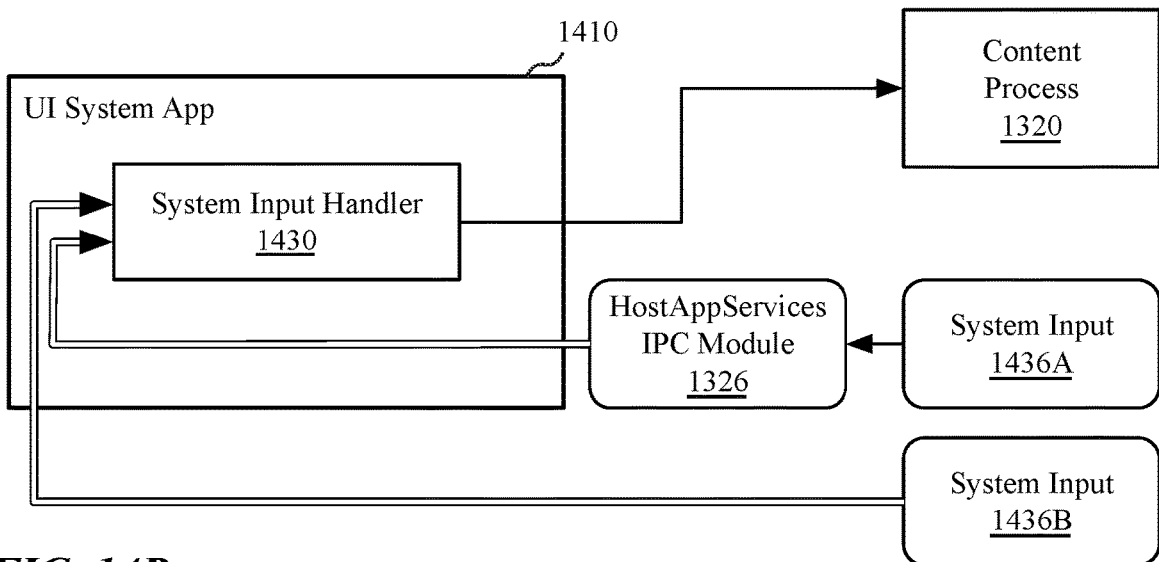

FIG. 14A-14B illustrates interaction between system services and a multi-process application, according to embodiments described herein. As shown in FIG. 14A, in one embodiment a UI system app 1410 facilitates the bridging of interactions between the content process 1320 and the host process 1330. The system launcher service can perform a foster launch process 1422 for the content process 1320, which will launch and establish a connection with a foster module 1414 of the UI system application 1410. The system launcher can then perform an adopt launch process 1432 for the host process 1330, which will establish a connection with an adopt module 1412 within the UI system app 1410. The foster-adopt process enables a multi-process application, which is a combination of multiple applications, to operate as a single application. Window controller interaction and window frame generation are handled by the host process 1330. Content generation is handled by the content process 1320. The system application 1410 can then create a window controller scene 1416 and notify the content process 1320 and host process 1330 that application operations can begin.

As shown in FIG. 14B, system input 1436A-1436B from the host platform can be handled using multiple techniques.

In one embodiment, some types of system input 1436A is handled differently by the host platform relative to the mobile platform, while some system input 1436B can be relayed more directly.

For example, an open URL command can be received as system input 1436A, which is communicated to the host application services IPC module 1326. The host application IPC services module 1326 can translate the input and relay the command to a system input handler 1430 in the UI system application 1410. The system input handler 1430 can then send an action to the content process 1320 to open the URL. In this manner, system input 1436A can be delivered by the system in a format that is native to the host platform and then translated into the input expected by the content process 1320. The action transmitted by the system input handler to the content process 1320 is the same action that would be received were the content process executing on a mobile platform.

In one embodiment, some types of system input 1436B can be transmitted directly to the UI system app 1410 from a system module of the host platform, where those modules are configured for multi-platform operation. System input 1436B can be sent directly to the system input handler 1430 of the UI system app 1410 without traversing the host application IPC services module 1326. For example, some types of remote notifications to the content process 1320 can be delivered directly to the system input handler 1430 within the UI system app 1410.

Figure 15A:
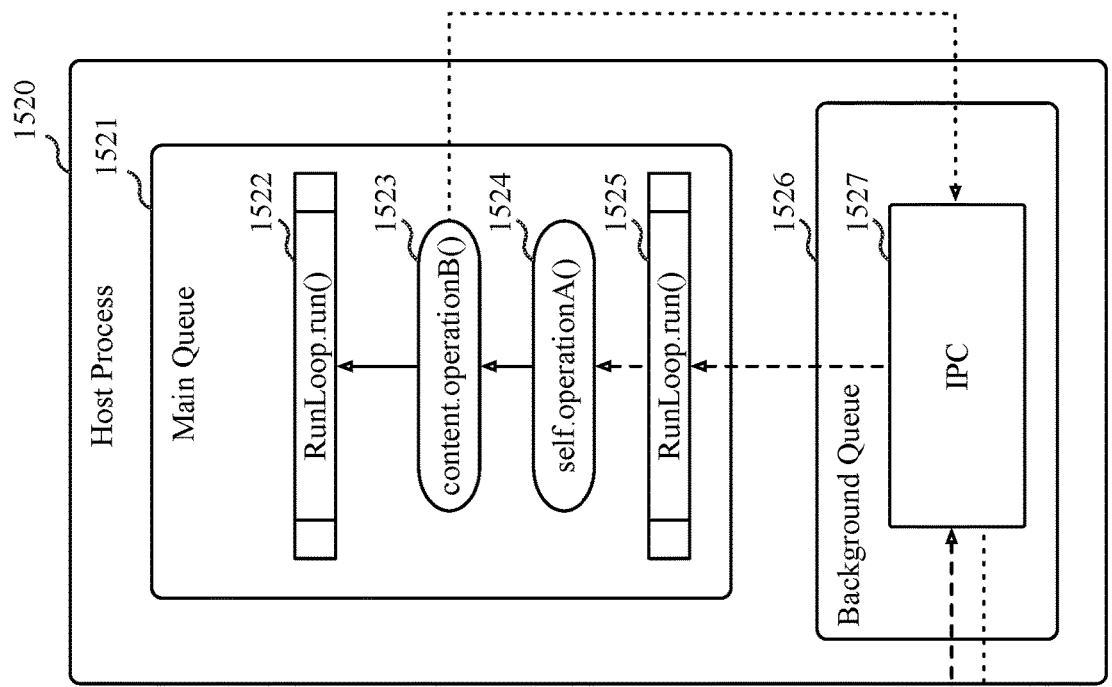
FIG. 15A-15B illustrate deadlock prevention for a multi-process application, according to embodiments.
Figure 15A:
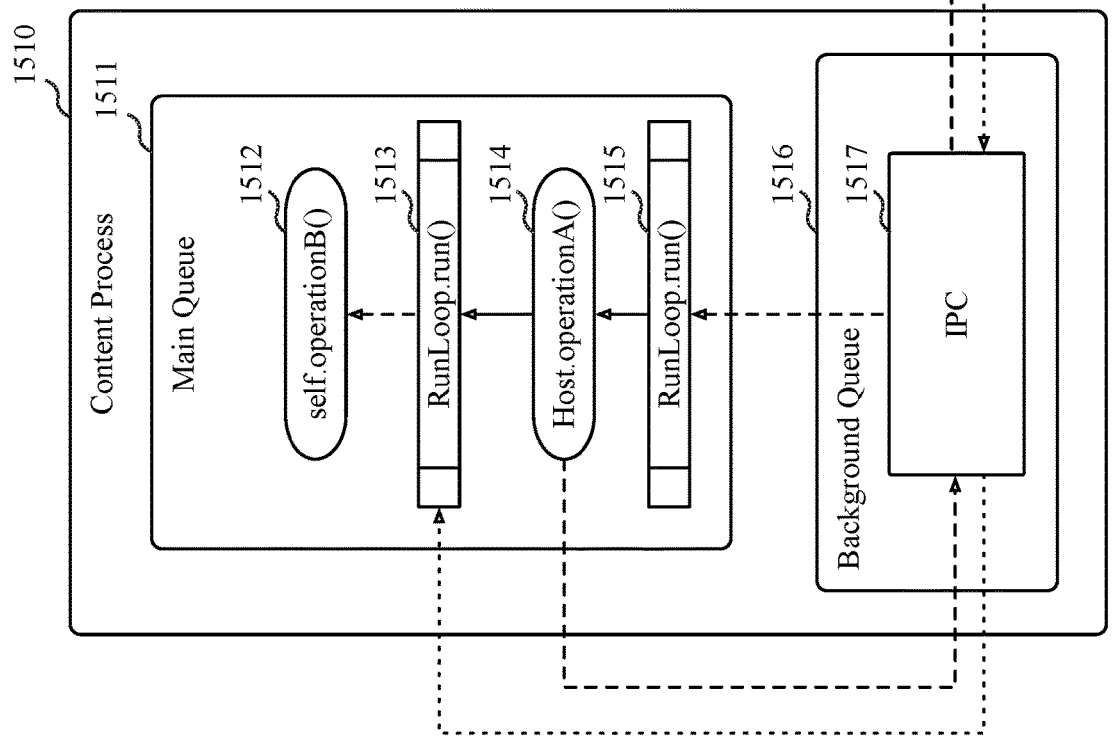
Figure 15B:
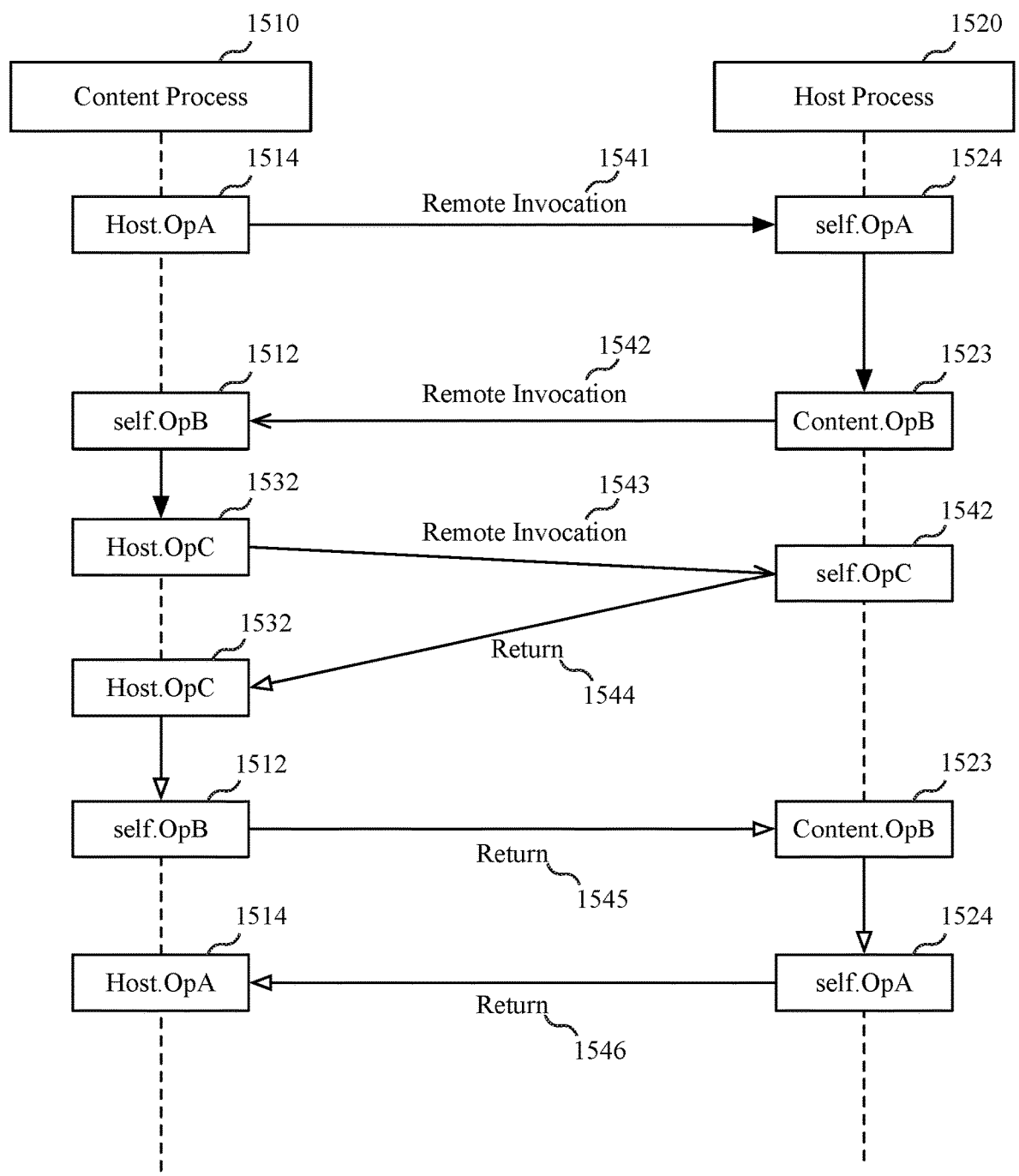

FIG. 15A-15B illustrate deadlock prevention for a multi-process application, according to embodiments. As shown in FIG. 15A, a content process 1510 can communicate with a host process 1520 to display content on a host platform. In one embodiment, the content process 1510 and the host process 1520 engage in synchronous communication via remote invocation messages that are transmitted over one or more inter-process communication techniques described herein. The content process 1511 includes a main queue 1511, which is an event processing run loop that is used to schedule work and coordinate the receipt of incoming events at the content process 1511. The host process 1520 also includes a main queue 1521 that functions as an event processing run loop. During operation of the main queues 1511, 1521, the process run loop is called whenever an event is detected that corresponds to a configured mode for the run loop. The run loop of a main queue of the processes can monitor sources of input to a task and dispatch control when those inputs become ready for processing. Examples of input sources can include user input devices, network connections, periodic or time-delayed events, and asynchronous callbacks.

The interaction of operations of the content process 1510 and the host process 1520 may present a scenario in which deadlocks may arise when the content process 1510 and the host process 1520 each become dependent upon operations performed by the other process. For example, during an iteration of the main queue 1511 of the content process (RunLoop.run 1515), the content process 1510 can invoke an operation of the host process (Host.operationA( ) 1514). The remote invocation operation A at the content process 1511 results in the relay of messages over an IPC channel to the host process 1520, triggering an event in the main queue 1521 of the host process 1521. Execution of operation A at the host process (self.operationA( ) 1524) may require a call into operation B on the content process (content.operationB( ) 1523), triggering a call back to the content process 1510, where run loop invocation 1513 triggers a call to operation B 1512. At this point, a deadlock can occur within the main queues 1511, 1521 of each process 1510, 1520. Proxy operation calls between processes operate in the same manner is conventional function calls. The calls between processes are synchronous and that forward progress of each process is halted while waiting for the results of a pending proxy function call. Thus, if a scenario arises in which each process 1510, 1520 is waiting on output of the other, neither can make forward progress and a deadlock occurs. Such scenario can occur during user interface operations such as changing a pointer cursor, when generating and validating menu elements for a menu bar or performing other operations that require synchronous interaction between the content process 1510 and the host process 1520.

Embodiments described herein can avoid inter-process deadlocks via the addition of background queues 1516, 1526 to each process 1510, 1520. In general, user interface events are processed in the main queues 1511, 1521 due to the interactive nature of those events. However, the background queues 1516, 1526 added to the content process 1510 and the 1520 are special purpose background queues that are used to enable inter-process interactivity between the processes during certain UI events to enable mutual reentrancy during synchronous interaction without blocking the run loops of the main queues 1511, 1521. In one embodiment, the background queues 1516, 1526 enable the stacking and unwinding of IPC operations 1517, 1527 during nested calls. When a proxy function call to another process of a multi-process application is initiated the run loop of the main queue 1511, 1521 of the process can be placed into a special operation mode that accepts IPC requests from other processes of the multi-process application, but otherwise does not allow conventional event processing to proceed.

For example, in one embodiment a UI operation, such as an operation that occurs during a menu item validation event, can be processed in the main queue 1511 of the content process 1510. To handle the event, a proxy invocation of operation A (Host.operationA( ) 1514) is called by the content process 1510, which triggers a remote invocation call via one or more IPC operations 1517. In one embodiment, the one or more IPC operations 1517 can be placed in the background queue 1516 and a service thread associated with the content process 1510 can transmit messages associated with the IPC operations 1517 to the host process 1521. In one embodiment, when the one or more IPC operations 1517 are associated with high priority (e.g., interactive) tasks, for example, when the multi-process application is an active foreground application, the one or more IPC operations 1517 are sent from the main queue 1511. Sending from the main queue 1511 enables priority donation to be performed to prevent a priority inversion. Although the operation is a synchronous operation, the messages associated with the IPC operations 1517 can be transmitted asynchronously so as to not block the run loop of the main queue 1511. A service thread associated with the host process 1520 can receive the messages associated with the IPC operations 1517 and place those messages in the background queue 1526 of the host process 1520 for processing.

In one embodiment, the priority of a sending process can be donated to a receiving process. The sending process can send a priority donation voucher to the receiving process. If the receiving process is operating at a lower priority than the sending process, the priority donation voucher allows the receiving process to operate at the higher priority associated with the sending process, to prevent the higher priority sending process from being delayed by a lower priority receiving process. Priority donation may be particularly important when one or more threads of the receiving process are operating a low priority. For example, if the content process 1510 is operating at a high (e.g., interactive) priority the higher priority will be donated to the host process 1520. Even through the messages for the IPC operations 1517 are placed in the background queue 1526 of the host process, the messages can be processed at the priority donated from the content process 1510. The host process 1520 can retain the high priority until a reply is sent.

Based on the received message, a service thread of the host process 1520 can trigger an event that will be picked up during a cycle of the run loop (RunLoop.run( ) 1525) of the main queue 1521 of the host process 1520. The main queue 1521 can handle the event by calling the implementation of operation A (self.operationA 1524). If the implementation of operation A requires information from the content process that can be provided, for example, via remote proxy call to operation B of the content process (content.operationB( ) 1523), IPC operations 1527 to enable the remote call can be placed in to the background queue 1526 of the host process 1520. The IPC operations 1527 can also be sent from the main queue 1521 if the host process 1521 is operating at interactive priority, allowing the use of the priority donation system described above. Messages to enable such operations can be transmitted by a service thread of the host process 1520 to the content process 1510. Those messages can be received and a reentrant invocation (RunLoop.run (1513) of the run loop can be performed to call operation B (operation B( ) 1512). General UI event processing is not performed during this sequence, as the run loops of the main queues 1511, 1521 are transitioned to a special remote-invocation mode in which only events associated with remote function invocations are processed. The special run loop mode enables operations associated with remote proxy invocations to be performed asynchronously, in a non-blocking manner, while ensuring that the stacking and unwinding of those operations is performed quickly enough to maintain an interactive level of performance. Once the nested remote calls unwind, the run loops can be returned to their previous modes of operation. For example, RunLoop.run( ) 1522 of the host process can be run in the default run loop mode.

In one embodiment, run-loop reentrancy for remote function invocations is enabled via atomically updated generation counts to status variables associated with the processing of operations within the main queues 1511, 1521. Variables associated with a first round IPC calls are given a generation count associated with that round of call. When a reentrant call is made, the previous set of variables, particularly, dynamically allocated variables that are not stored on the stack, are preserved and a generation count for those variables is atomically updated. As nested calls are unwound, the generation counts are decremented. Once the generation count reaches zero, or another pre-determined value, the run loop and IPC system can determine that a nested call stack has been resolved and normal operation can resume.

In one embodiment, processes 1510, 1520 are configured to relay state associated with any spurious wakeups that are received while processing interactive multi-process activities. For example, while waiting for the return of a remotely invocated proxy function, a process can be placed into a sleep state while other operations are performed. In one embodiment, during a set of nested calls, the thread and process management logic attempts to wake only the most recently waiting thread. However, it cannot always be ensured that threads are awoken in the correct order. It may be possible for a process or thread to be awoken spuriously, such that the process wakes and receives an event that should be handled by another process. To address this issue, the processes 1510, 1520 can be configured to store any events received during spurious wakes and relay those events to other waiters. In one embodiment, the spurious wakeups involve a call made earlier, on an earlier stack frame, on the same thread. When the main thread for a process is woken, the kernel and other components consider the wakeup to have been delivered. However, the thread may still be waiting on a replay for a call in a later stack frame. In such embodiment a generation count is used to ensure that, as the call stack unwinds, any spurious wakeups that were received can be properly associated with the run loop invocation to which the wakeup belongs. Any number of outstanding calls can be waiting for results and the results will be assigned to the proper call, without regard to the order in which the results are received. Without spurious wakeup handling, processing may fail due to a mismatch between sleeping threads and call responses, as the kernel may assume that a waiting thread has already been woken, even though the thread did not actually receive its response within the proper stack frame.

As shown in FIG. 15B, the content process 1510 and host process 1520 can engage in a series of nested remote function calls using an IPC communication channel. A remote proxy for a first operation (Host.OpA 1514) can be called at the content process 1510, which triggers a remote invocation 1541 of the implementation of the operation (self.OpA 1524). Instead of conveying the remote invocation 1541 via blocking (e.g., synchronous) IPC operations, the remote invocation 1541 is conveyed asynchronously to the host process 1520. Execution of the implementation of the first operation can include a call to a remote proxy of a second operation (Content.OpB 1523), which causes an asynchronous remote invocation 1542 of the second operation (self.OpB 1512) at the content process 1510. IPC messages for remote invocation 1542 can be stored in background queue 1516 of the content process 1510. The run loop of the content process 1510 can be configured to a special remote invocation mode. A remote invocation event can be triggered to cause the run loop of the content process 1510 to pick up the IPC messages associated with remote invocation 1542.

In one embodiment, nested calls can continue with a remote invocation 1543 of a proxy third operation (Host.OpC 1532) from within the implementation of the second operation. The implementation of the third operation (self.OpC 1542) within the host process 1520 can execute and return 1544 data via the remote proxy of the third operation (Host.OpC 1532). The call stack can unwind via a return 1545 from the second operation and return 1546 from the first operation. The generation count is atomically updated during each cycle of nested calls. When the call stack unwinds, the generation count is atomically decremented.

Figure 16A:
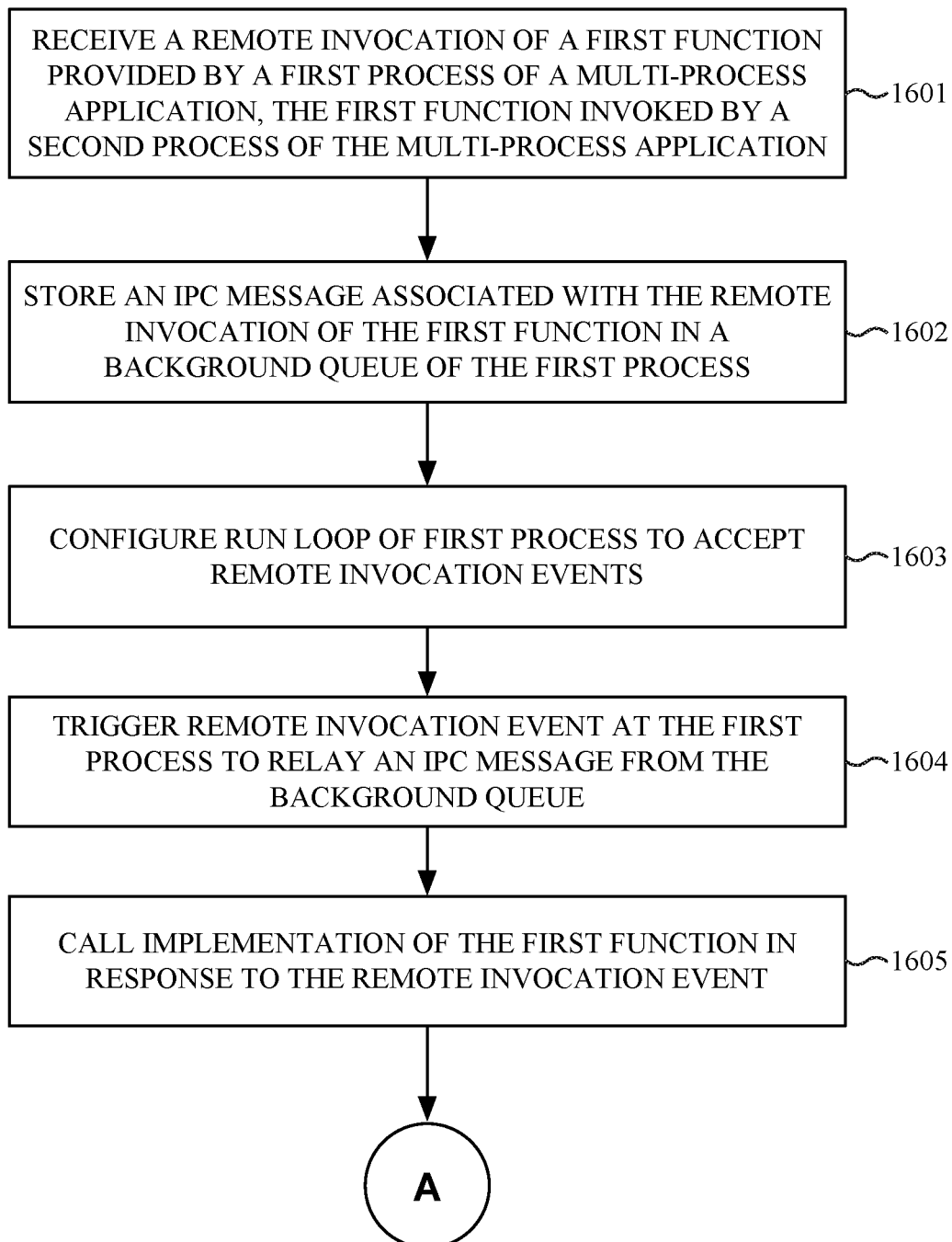
FIG. 16A-16C are a flow diagram of a method of relaying messages associated with nested remote function invocations within a multi-process application, according to embodiments.

FIG. 16A is a flow diagram of a method 1600 of relaying messages associated with nested remote function invocations within a multi-process application, according to an embodiment. In one embodiment, method 1600 is performed by software logic executing on one or more processors of a data processing system described herein. The software logic includes logic of the content process 1510 and host process 1520 of FIG. 15A. In one embodiment, method 1600 includes operation 1601, which receives a remote invocation of a first function provided by a first process of a multi-process application. The function can be invoked by a second process of the multi-process application. For example, the content process 1510 of a multi-process application can call into a function provided by the host process 1520.

To relay the remote invocation between processes, method 1600 can perform operation 1602, which stores an IPC message associated with the remote invocation of the first function in a background queue of the first process. In one embodiment the IPC message can be stored in the background queue of the first process after being transmitted from a background queue of the second process. Method 1600 additionally includes operation 1603, which configures the run loop of the first process to accept only remote invocation events, which are special events used to pass remote invocation messages. The events for which the run loop will respond can be configured by changing the mode in which the run loop is executed. The mode of the run loop is the collection of input sources and timers to be monitored on behalf of the run loop. When events that correspond with the configured mode of a run loop occur, the run loop is notified by the system.

Method 1600 additionally includes operation 1604, which triggers a remote invocation event at the first process to relay the IPC message from the background queue. The run loop of the first process can pick up the remote invocation event and retrieve data associated with the IPC message. The first process can then respond to the IPC event via operation 1605, which calls the first function. The first function can then be executed by the first process using execution state specified by the second process.

Figure 16B:
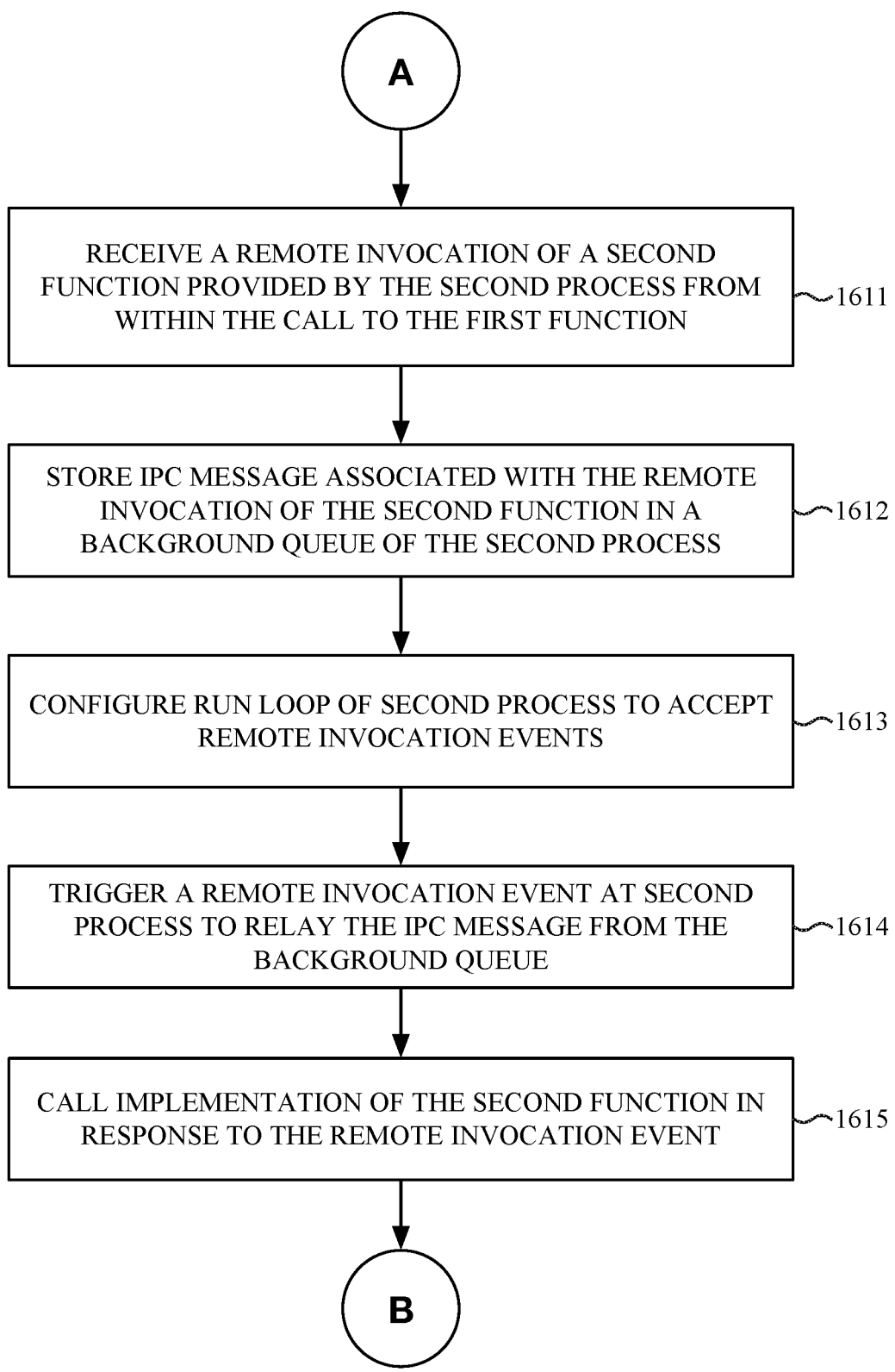

As shown in FIG. 16B, completion of the first function call at the first process may require a remote invocation of a second function provided by the second process. Method 1600 can continue to operation 1611, which receives a remote invocation of a second function provided by the second process from within the call to the first function. Method 1600 can then perform operation 1612, which stores an IPC message associated with the remote invocation of the second function in a background queue of the second process. The nested remote invocation is sent asynchronously, even though the function call is logically a synchronous operation. Method 1600 additionally includes operation 1613 to configure the run loop of the second process to accept only IPC events. Method 1600 additionally includes operation 1614, which triggers an IPC event at second process to relay IPC message associated with the remote invocation from the background queue. Method 1600 continues to operation 1615, which responds to the IPC event at second process by calling the implementation of the second function.

Figure 16C:
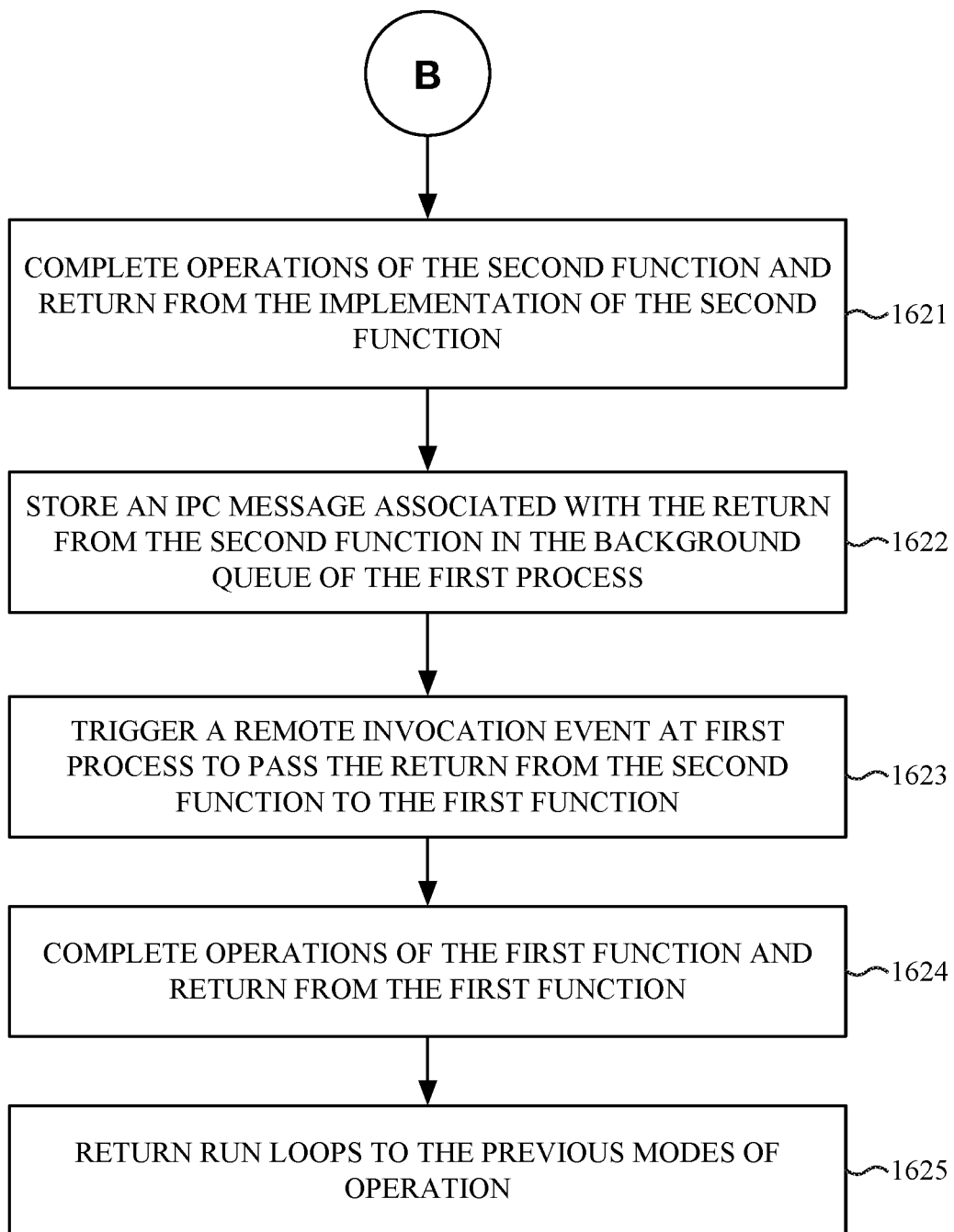

As shown in FIG. 16C, method 1600 continues at operation 1621 in which operations at the second function of the section process are completed and the implementation of the second function returns. Method 1600 can then proceed to operation 1622 to store an IPC message associated with the return from the second function in the background queue of the first process. Method 1600 then proceeds to operation 1623, which triggers a remote invocation event at first process to pass the return from the second function to the first function. The operations of the first function can complete at operation 1624 and the first function can return. Once the first function returns and the nest of calls is determined to be unwound, method 1600 can proceed to operation 1626 to return the run loops to the previous modes of operation for the processes.

Figure 17A:
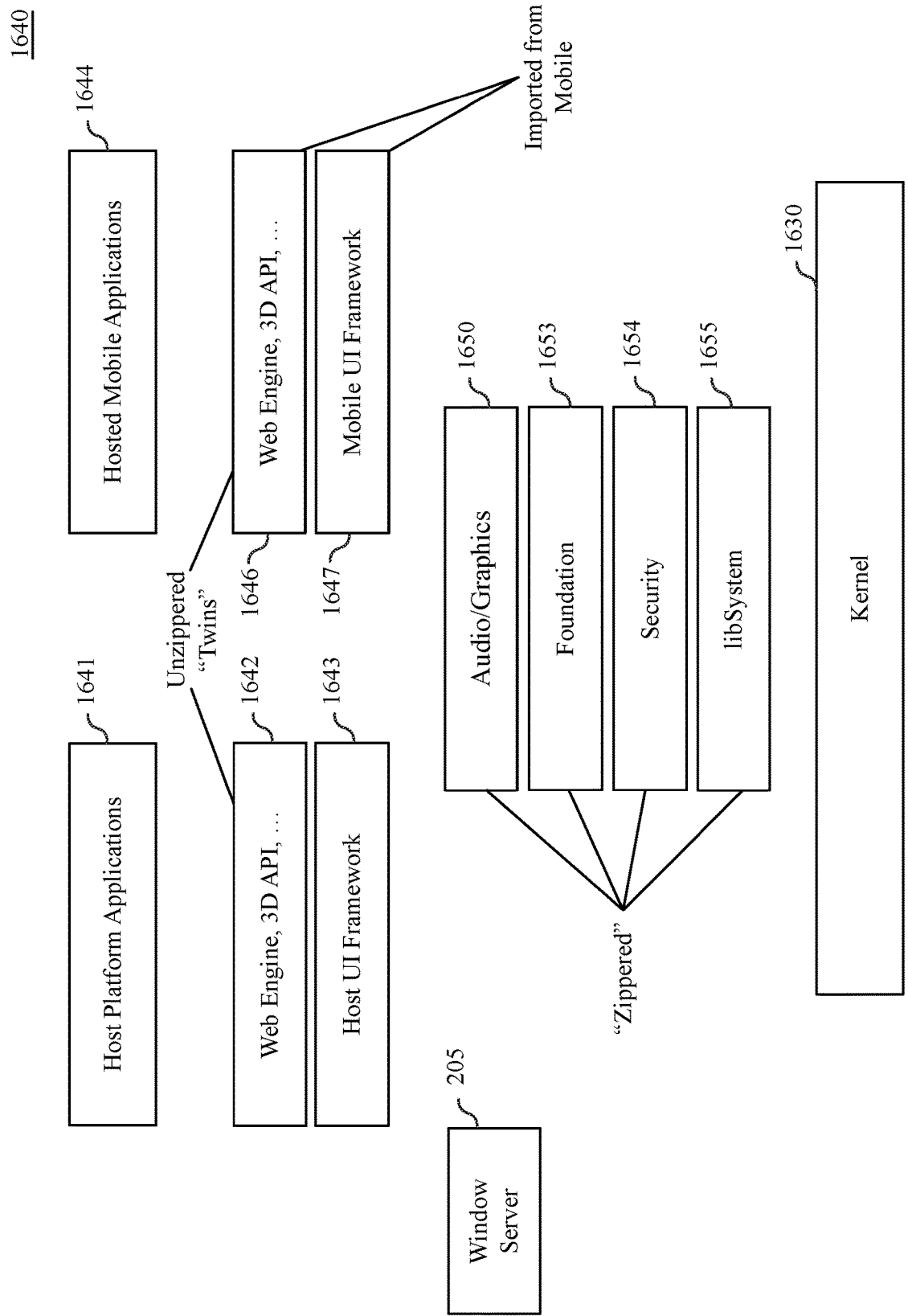
FIG. 17A-17B illustrate a system and method on a host platform to enable execution of a hosted mobile application, according to embodiments described herein.
Figure 17B:
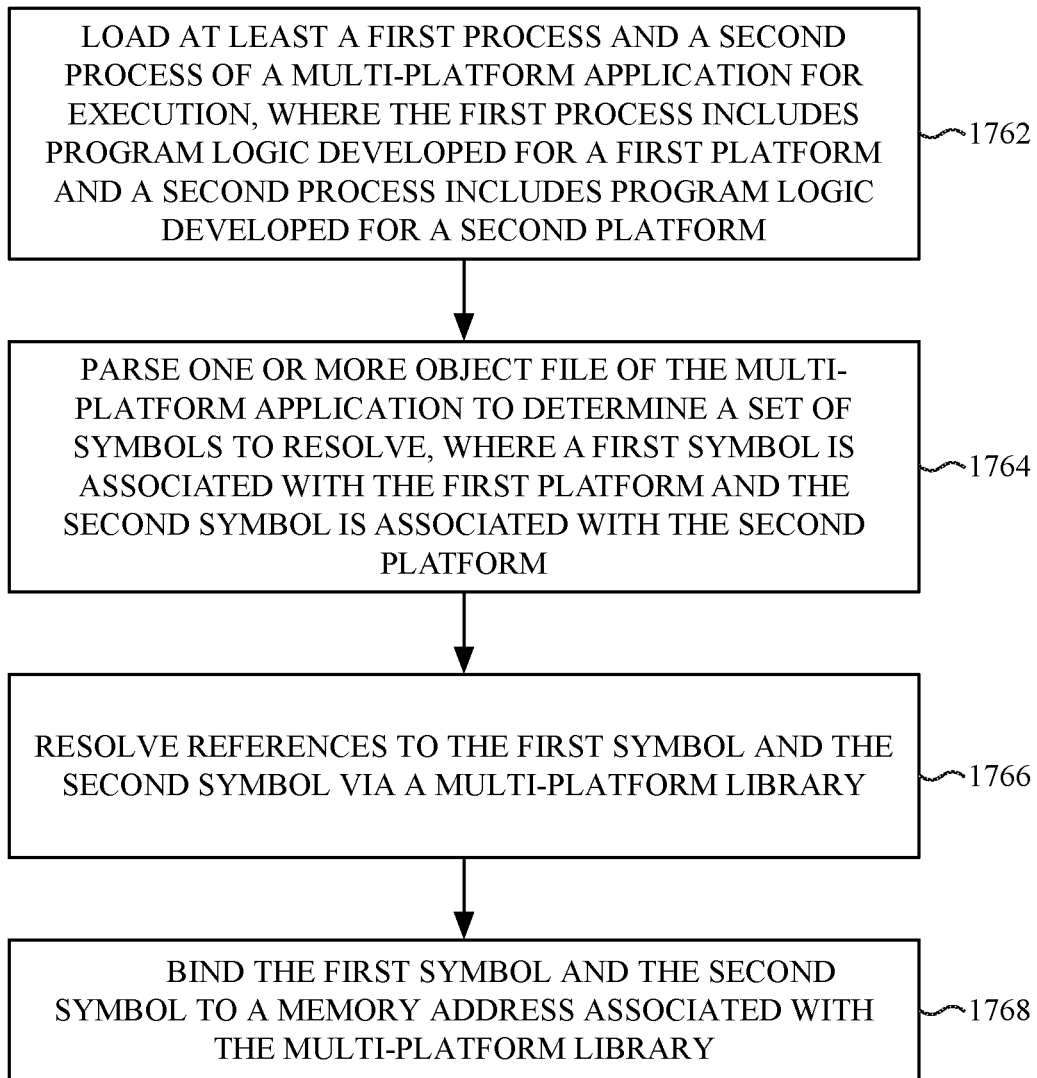

FIG. 17A-17B illustrate a system and method on a host platform to enable execution of a hosted mobile application, according to embodiments described herein. FIG. 17A illustrates a system 1740 of frameworks on a host platform that enable execution of a hosted mobile application. FIG. 17B illustrates a method 1760 of loading multi-platform libraries on the host platform. The system 1740 of frameworks can reside on a computing device associated with a host platform as described herein. Method 1760 is a computer implemented method performed by one or more processors described herein.

As shown in FIG. 17A, in one embodiment, hosted mobile applications 1744 can be based on program code that can alternately be compiled to execute on a mobile platform or as a hosted application that can execute within the host operating environment of system 1740. When compiled for hosted execution, hosted mobile applications 1744 can execute alongside host platform applications 1741 that are designed and compiled for execution on the host operating environment. In one embodiment, some of the mobile functionality can be enabled by integrating some of the support provided to simulated mobile applications into the libraries and frameworks that are available to all applications executing on the host operating environment of system 1740.

In one embodiment the host operating environment of system 1740 can include versions of libraries and frameworks from a host framework stack that are extended to include functionality used by host platform applications 1741 and hosted mobile applications 1744. Such libraries and frameworks can be described as zippered. Some libraries and frameworks of the host framework stack 1710 cannot be combined with corresponding libraries that perform similar functionality due to API incompatibilities or other incompatibilities between the libraries. Accordingly, multiple instances of those libraries (e.g., unzippered twins) can reside in the host operating environment of system 1740, with one instance provided for use by host platform applications 1741 and a second instance provided for use by hosted mobile applications 1744. The specific details of which libraries fall into which category can vary across embodiments. In general, embodiments described herein provide systems and methods by which a build environment, linker, and loader for the host operating environment can be configured to support the various classifications of libraries and frameworks that would reside in a host operating environment that supports multi-OS applications.

Exemplary zippered libraries and frameworks include an audio/graphics framework 1750, a foundation framework 1753, security framework 1754, and system library 1755 (e.g., lib System). The zippered libraries and frameworks provide a superset of functionality accessed by host platform applications 1741 and hosted mobile application 1744. Exemplary unzippered twin libraries and frameworks include high-level libraries and frameworks 1742, 1746 (e.g., web engines, 3D APIs) that provide similar functionality, but have incompatibilities and prevent integration. Additional unzippered libraries and frameworks include the host UI framework 1743 and the mobile UI framework 1747, which are different frameworks that each provide similar functionality.

The illustrated libraries and frameworks of host operating environment of system 1740 can be dynamic libraries with multiple versions, with some versions that can be compiled for a mobile platform, other versions that can be compiled for a host (e.g., desktop/laptop) platform, and still other versions that can be compiled to provide functionality to mobile applications that are compiled for execution on the host operating environment.

As shown in FIG. 17B, method 1760 includes to perform an operation 1762 to load at least a first process and a second process of a multi-platform application for execution. The multi-platform application can execute as two or more processes that include at least a first process and a second process, where the first process includes program logic developed for a first platform and a second process includes program logic developed for a second platform. The first platform can be, for example, a mobile platform, while the second platform can be a host platform configured to execute hosted mobile applications. In some embodiments, three or more processes can be associated with the multi-platform application, for example, to enable hardware features that may be present on some instances of a host platform. In one embodiment, a third process associated with the host platform can be present to enable a touch bar feature, such as the touch bar 920 of FIG. 9B, or another hardware feature of the host platform.

In one embodiment, method 1760 additionally includes operation 1764 to parse one or more object files of the multi-platform application to determine a set of symbols to resolve. In operation 1764, a first symbol in the set of symbols is associated with the first platform, while the second symbol in the set of symbols is associated with the second platform. The compiled program code of the various processes of the multi-platform application can reside in a single executable object file or a package including multiple object files. The parsing of operation 1764, in one embodiment, can occur during the load of the multi-platform application.

In a further embodiment, method 1760 additionally includes operation 1766, to resolve references to the first symbol and the second symbol via a multi-platform library. The multi-platform library can be stored in memory of the host platform. The multi-platform library can be loaded into the memory prior to execution of the multi-platform application, for example, in association with the loading of another application. The multi-platform library can also be loaded into the memory during the load of the multi-platform application, for example, if the library was not previously loaded into memory.

After resolving the references to the first symbol and the second symbol, method 1760 can perform operation 1768 to bind the first symbol and the second symbol to memory associated with the multi-platform library, which includes the data (e.g., program code, objects, etc.) to which the symbols were resolved. The bind within operation 1768 links the multi-platform library with the multi-platform application. In one embodiment, the multi-platform library can also be linked to program code associated with a native application of the host platform.

Embodiments described herein include one or more application programming interfaces (APIs) in an environment in which calling program code interacts with other program code that is called through one or more programming interfaces. Various function calls, messages, or other types of invocations, which further may include various kinds of parameters, can be transferred via the APIs between the calling program and the code being called. In addition, an API may provide the calling program code the ability to use data types or classes defined in the API and implemented in the called program code.

An API allows a developer of an API-calling component (which may be a third-party developer) to leverage specified features provided by an API-implementing component. There may be one API-calling component or there may be more than one such component. An API can be a source code interface that a computer system or program library provides to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments, the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments, the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic.

In some embodiments, an API may allow a client program to use the services provided by a Software Development Kit (SDK) library. In other embodiments, an application or other client program may use an API provided by an Application Framework. In these embodiments, the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low-level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however, the API may be implemented in terms of a specific programming language. An API-calling component can, in one embedment, call APIs from different providers such as a set of APIs from an OS provider and another set of APIs from a plug-in provider and another set of APIs from another provider (e.g., the provider of a software library) or creator of the another set of APIs.

Figure 18:
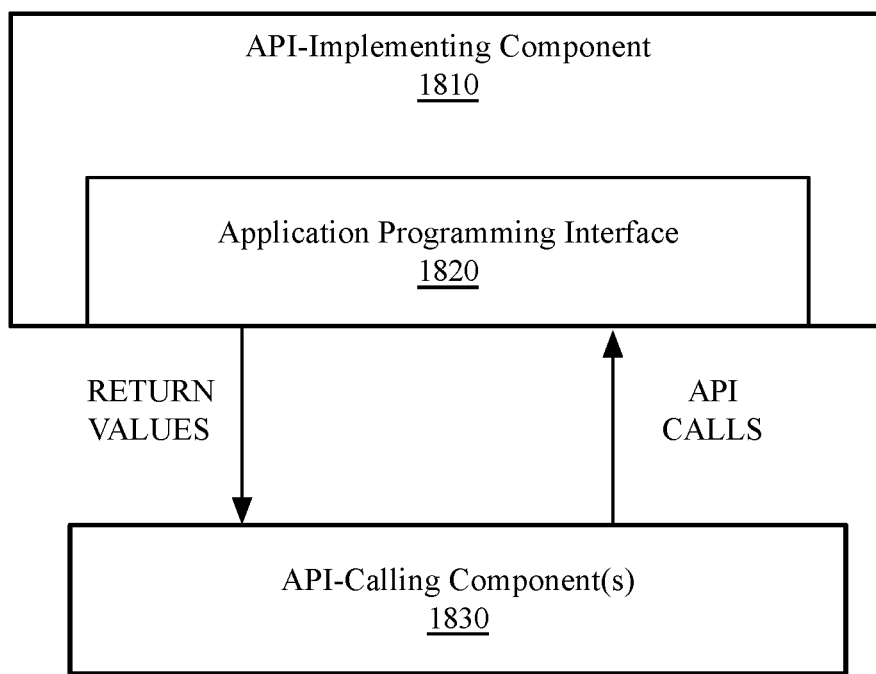
FIG. 18 is a block diagram illustrating an exemplary API architecture, which may be used in some embodiments of the invention.

FIG. 18 is a block diagram illustrating an exemplary API architecture, which may be used in some embodiments of the invention. As shown in FIG. 18, the API architecture 1800 includes the API-implementing component 1810 (e.g., an operating system, a library, a device driver, an API, an application program, software, or other module) that implements the API 1820. The API 1820 specifies one or more functions, methods, classes, objects, protocols, data structures, formats and/or other features of the API-implementing component that may be used by the API-calling component 1830. The API 1820 can specify at least one calling convention that specifies how a function in the API-implementing component receives parameters from the API-calling component and how the function returns a result to the API-calling component. The API-calling component 1830 (e.g., an operating system, a library, a device driver, an API, an application program, software or other module), makes API calls through the API 1820 to access and use the features of the API-implementing component 1810 that are specified by the API 1820. The API-implementing component 1810 may return a value through the API 1820 to the API-calling component 1830 in response to an API call.

It will be appreciated that the API-implementing component 1810 may include additional functions, methods, classes, data structures, and/or other features that are not specified through the API 1820 and are not available to the API-calling component 1830. It should be understood that the API-calling component 1830 may be on the same system as the API-implementing component 1810 or may be located remotely and accesses the API-implementing component 1810 using the API 1820 over a network. While FIG. 18 illustrates a single API-calling component 1830 interacting with the API 1820, it should be understood that other API-calling components, which may be written in different languages (or the same language) than the API-calling component 1830, may use the API 1820.

The API-implementing component 1810, the API 1820, and the API-calling component 1830 may be stored in a machine-readable medium, which includes any mechanism for storing information in a form readable by a machine (e.g., a computer or other data processing system). For example, a machine-readable medium includes magnetic disks, optical disks, random-access memory; read only memory, flash memory devices, etc.

Figure 19A:
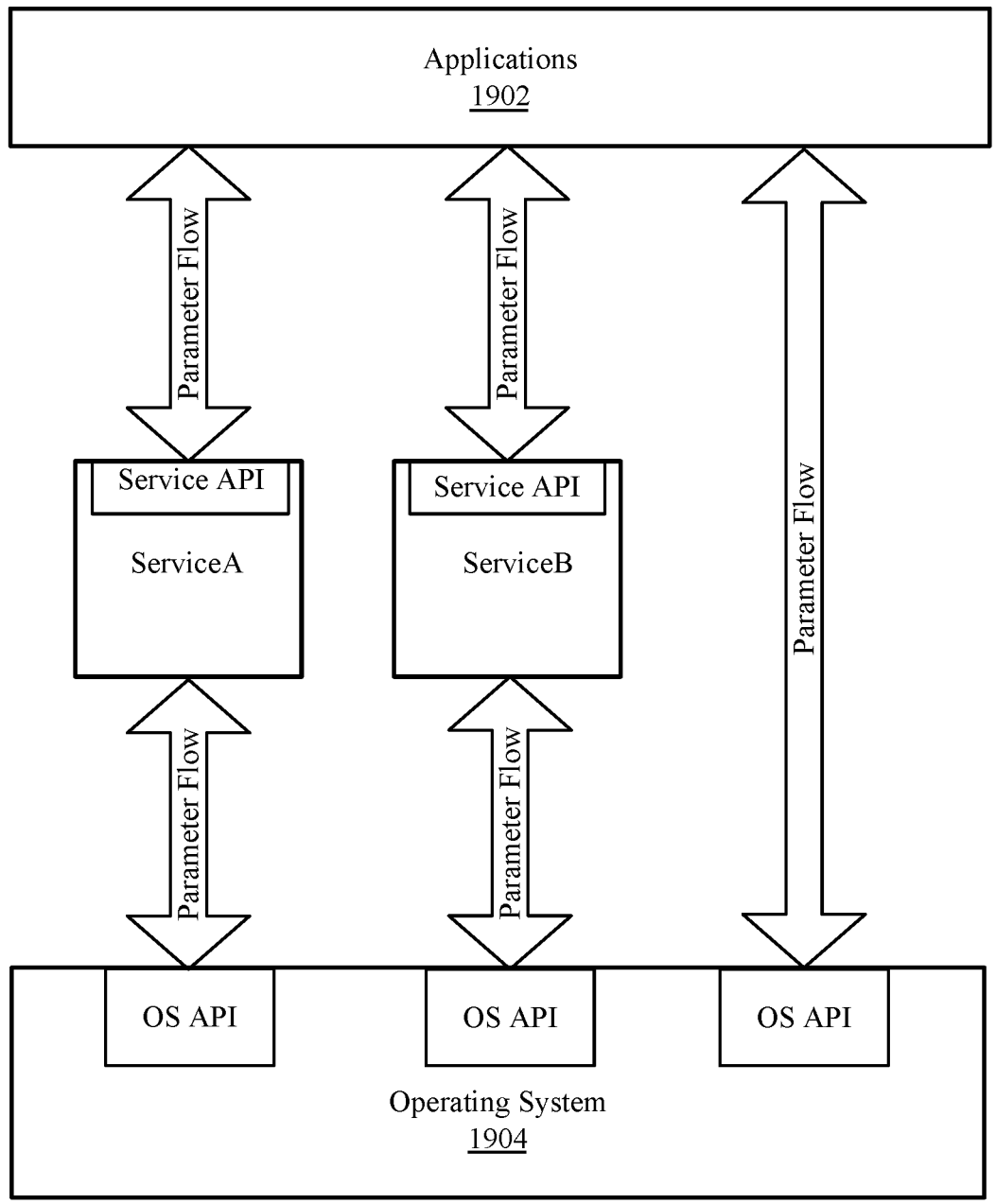
FIG. 19A-19B are block diagrams of exemplary API software stacks, according to embodiments.
Figure 19B:
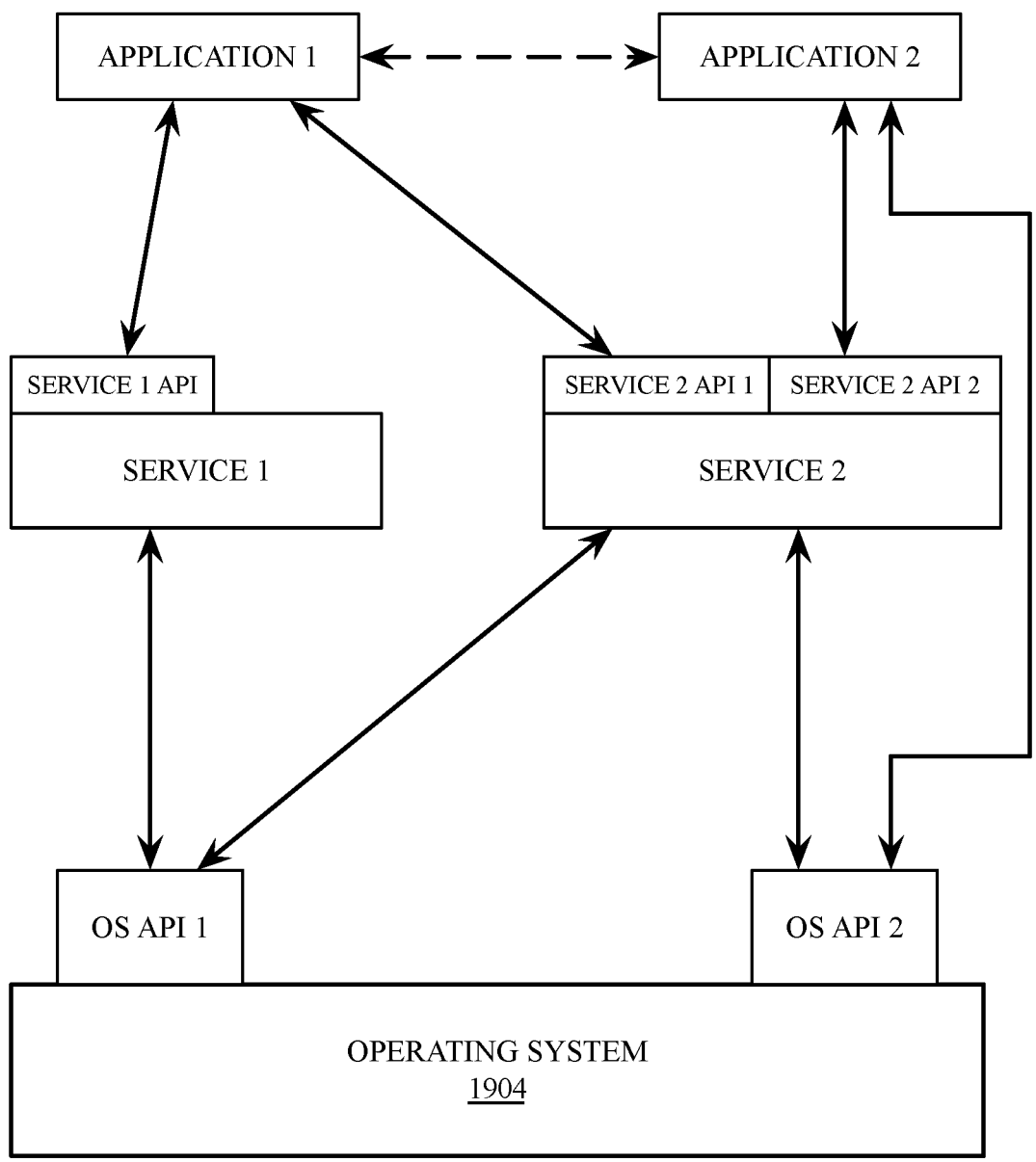

FIG. 19A-19B are block diagrams of exemplary API software stacks 1900, 1910, according to embodiments. FIG. 19A shows an exemplary API software stack 1900 in which processes 1902 can make calls to Service A or Service B using Service API and to Operating System 1904 using an OS API. Additionally, Service A and Service B can make calls to Operating System 1904 using several OS APIs. The processes 1902, in one embodiment, are multiple processes operating in concert to enable a multi-process application as described herein.

FIG. 19B shows an exemplary API software stack 1910 including Process 1 (1902A), Process 2 (1902B), Service 1 (1905), Service 2 (1906), and Operating System 1904. As illustrated, Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2. Service 1 can be, for example, a mobile UI framework as described herein, while Service 2 can be a host UI framework as described herein. Service 1 API and Service 2 API can be APIs implemented via a variant of the integrated IPC runtime interface described herein, which can enable interoperability between Process 1 and Process 2.

Figure 20:
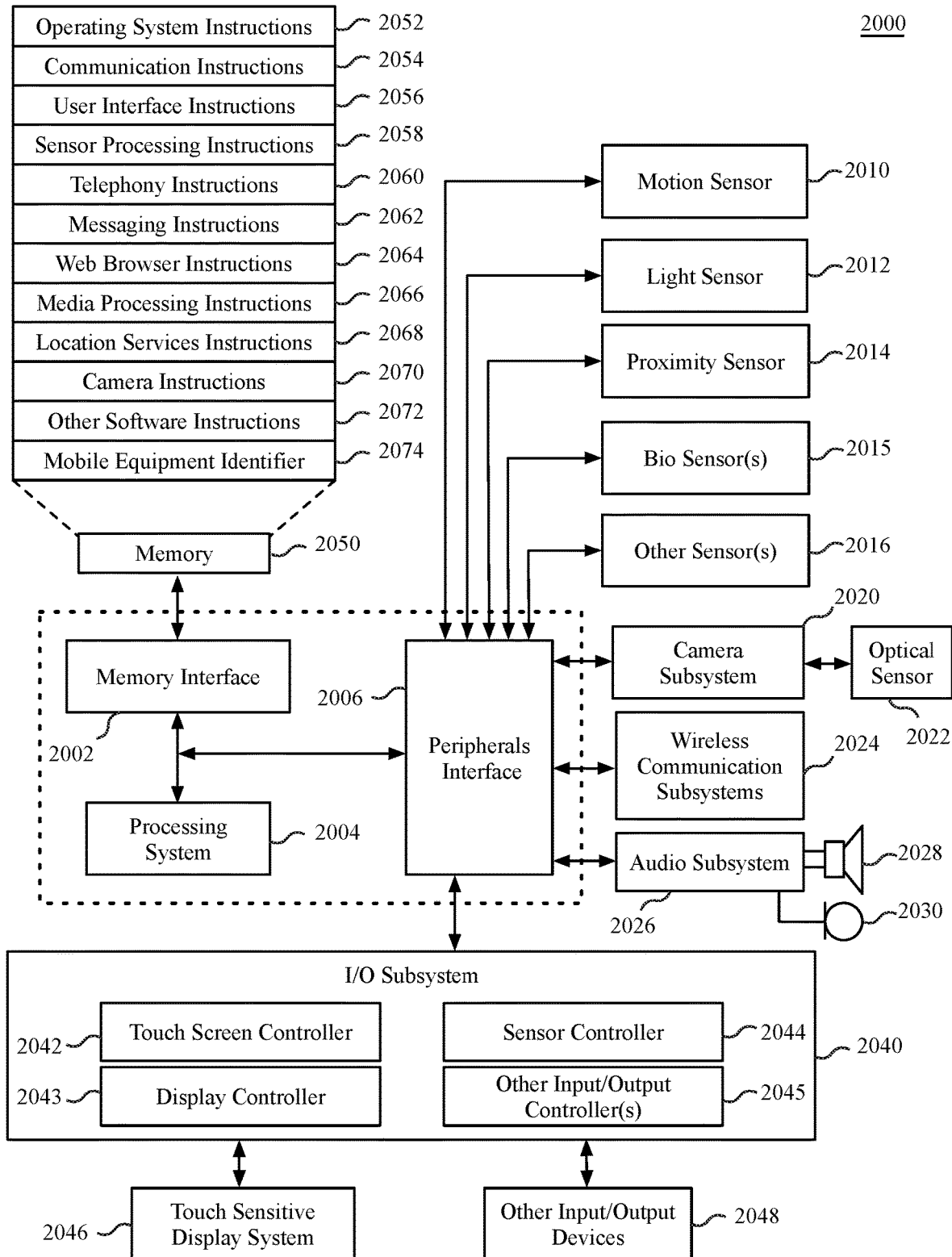
FIG. 20 is a block diagram of a device architecture for a mobile or embedded device, according to an embodiment.

FIG. 20 is a block diagram of a device architecture 2000 for a mobile or embedded device, according to an embodiment. The device architecture 2000 includes a memory interface 2002, a processing system 2004 including one or more data processors, image processors and/or graphics processing units, and a peripherals interface 2006. The various components can be coupled by one or more communication buses or signal lines. The various components can be separate logical components or devices or can be integrated in one or more integrated circuits, such as in a system on a chip integrated circuit.

The memory interface 2002 can be coupled to memory 2050, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 2006 to facilitate multiple functionalities. For example, a motion sensor 2010, a light sensor 2012, and a proximity sensor 2014 can be coupled to the peripherals interface 2006 to facilitate the mobile device functionality. One or more biometric sensor(s) 2015 may also be present, such as a fingerprint scanner for fingerprint recognition or an image sensor for facial recognition. Other sensors 2016 can also be connected to the peripherals interface 2006, such as a positioning system (e.g., GPS receiver), a temperature sensor, or other sensing device, to facilitate related functionalities. A camera subsystem 2020 and an optical sensor 2022, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 2024, which can include radio frequency receivers and transmitters and/or optical (e.g., infrared) receivers and transmitters. The specific design and implementation of the wireless communication subsystems 2024 can depend on the communication network(s) over which a mobile device is intended to operate. For example, a mobile device including the illustrated device architecture 2000 can include wireless communication subsystems 2024 designed to operate over a GSM network, a CDMA network, an LTE network, a Wi-Fi network, a Bluetooth network, or any other wireless network. In particular, the wireless communication subsystems 2024 can provide a communications mechanism over which a media playback application can retrieve resources from a remote media server or scheduled events from a remote calendar or event server.

An audio subsystem 2026 can be coupled to a speaker 2028 and a microphone 2030 to facilitate voice-enabled functions, such as voice recognition, voice replication, digital recording, and telephony functions. In smart media devices described herein, the audio subsystem 2026 can be a high-quality audio system including support for virtual surround sound.

The I/O subsystem 2040 can include a touch screen controller 2042 and/or other input controller(s) 2045. For computing devices including a display device, the touch screen controller 2042 can be coupled to a touch sensitive display system 2046 (e.g., touch-screen). The touch sensitive display system 2046 and touch screen controller 2042 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 2046. Display output for the touch sensitive display system 2046 can be generated by a display controller 2043. In one embodiment, the display controller 2043 can provide frame data to the touch sensitive display system 2046 at a variable frame rate.

In one embodiment, a sensor controller 2044 is included to monitor, control, and/or processes data received from one or more of the motion sensor 2010, light sensor 2012, proximity sensor 2014, or other sensors 2016. The sensor controller 2044 can include logic to interpret sensor data to determine the occurrence of one of more motion events or activities by analysis of the sensor data from the sensors.

In one embodiment, the I/O subsystem 2040 includes other input controller(s) 2045 that can be coupled to other input/control devices 2048, such as one or more buttons, rocker switches, thumb-wheel, infrared port, USB port, and/or a pointer device such as a stylus, or control devices such as an up/down button for volume control of the speaker 2028 and/or the microphone 2030.

In one embodiment, the memory 2050 coupled to the memory interface 2002 can store instructions for an operating system 2052, including portable operating system interface (POSIX) compliant and non-compliant operating system or an embedded operating system. The operating system 2052 may include instructions for handling basic system services and for performing hardware dependent tasks. In some implementations, the operating system 2052 can be a kernel.

The memory 2050 can also store communication instructions 2054 to facilitate communicating with one or more additional devices, one or more computers and/or one or more servers, for example, to retrieve web resources from remote web servers. The memory 2050 can also include user interface instructions 2056, including graphical user interface instructions to facilitate graphic user interface processing.

Additionally, the memory 2050 can store sensor processing instructions 2058 to facilitate sensor-related processing and functions; telephony instructions 2060 to facilitate telephone-related processes and functions; messaging instructions 2062 to facilitate electronic-messaging related processes and functions; web browser instructions 2064 to facilitate web browsing-related processes and functions; media processing instructions 2066 to facilitate media processing-related processes and functions; location services instructions including GPS and/or navigation instructions 2068 and Wi-Fi based location instructions to facilitate location based functionality; camera instructions 2070 to facilitate camera-related processes and functions; and/or other software instructions 2072 to facilitate other processes and functions, e.g., security processes and functions, and processes and functions related to the systems. The memory 2050 may also store other software instructions such as web video instructions to facilitate web video-related processes and functions; and/or web shopping instructions to facilitate web shopping-related processes and functions. In some implementations, the media processing instructions 2066 are divided into audio processing instructions and video processing instructions to facilitate audio processing-related processes and functions and video processing-related processes and functions, respectively. A mobile equipment identifier, such as an International Mobile Equipment Identity (IMEI) 2074 or a similar hardware identifier can also be stored in memory 2050.

Each of the above identified instructions and applications can correspond to a set of instructions for performing one or more functions described above. These instructions need not be implemented as separate software programs, procedures, or modules. The memory 2050 can include additional instructions or fewer instructions. Furthermore, various functions may be implemented in hardware and/or in software, including in one or more signal processing and/or application specific integrated circuits.

Figure 21:
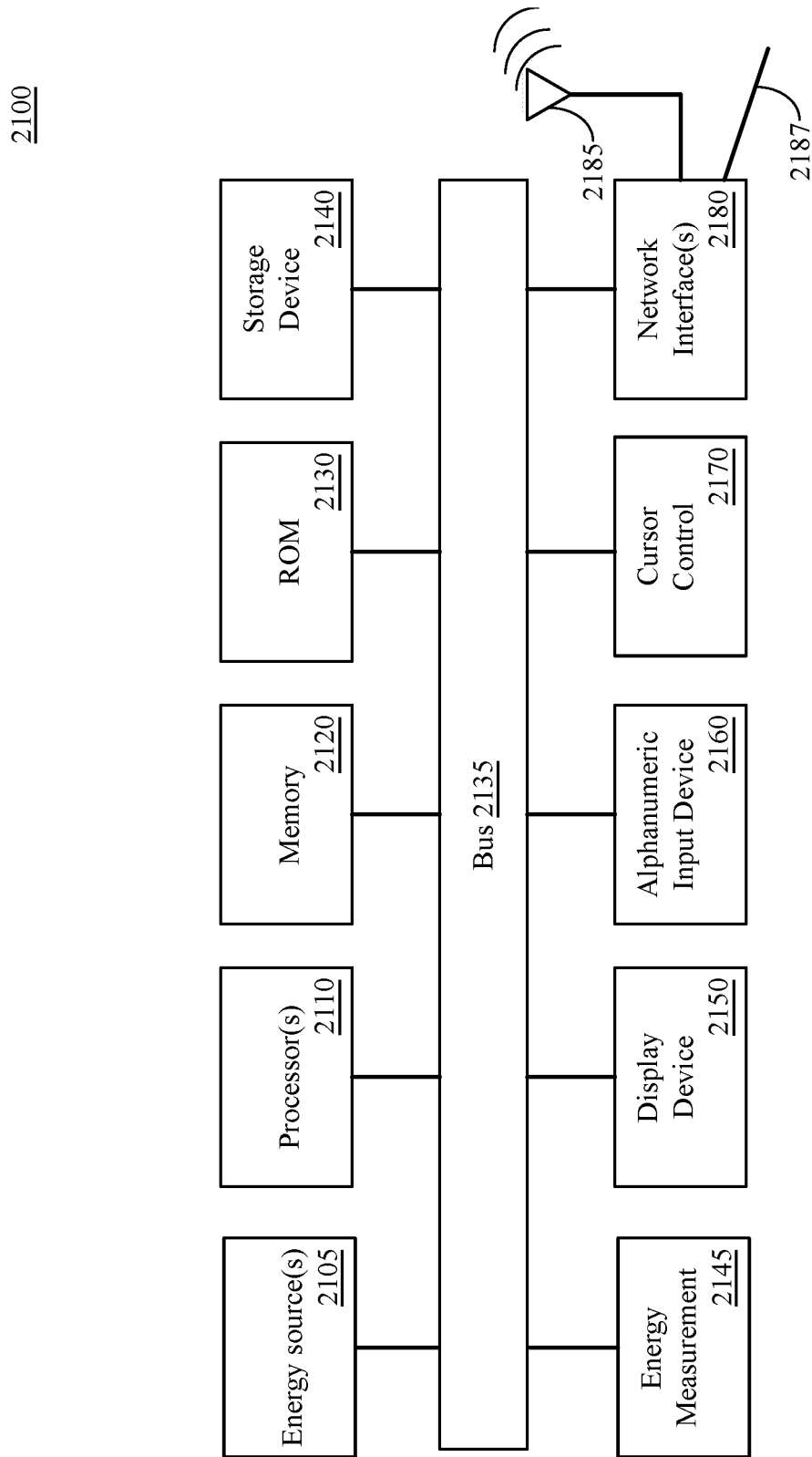
FIG. 21 is a block diagram of a computing system, according to an embodiment.

FIG. 21 is a block diagram of a computing system 2100, according to an embodiment. The illustrated computing system 2100 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system 2100 can be used to provide the computing device and/or a server device to which the computing device may connect.

The computing system 2100 includes bus 2135 or other communication device to communicate information, and processor(s) 2110 coupled to bus 2135 that may process information. While the computing system 2100 is illustrated with a single processor, the computing system 2100 may include multiple processors and/or co-processors. The computing system 2100 further may include 2120, such as a random access memory (RAM) or other dynamic storage device coupled to the bus 2135. The memory 2120 may store information and instructions that may be executed by processor(s) 2110. The memory 2120 can be used as main system memory and can be used to store temporary variables or other intermediate information during execution of instructions by the processor(s) 2110.

The computing system 2100 may also include read only memory (ROM) 2130 and/or another data storage device 2140 coupled to the bus 2135 that may store information and instructions for the processor(s) 2110. The data storage device 2140 can be or include a variety of storage devices, such as a flash memory device, a magnetic disk, or an optical disc and may be coupled to computing system 2100 via the bus 2135 or via a remote peripheral interface.

The computing system 2100 may also be coupled, via the bus 2135, to a display device 2150 to display information to a user. The computing system 2100 can also include an alphanumeric input device 2160, including alphanumeric and other keys, which may be coupled to bus 2135 to communicate information and command selections to processor(s) 2110. Another type of user input device includes a cursor control 2170 device, such as a touchpad, a mouse, a trackball, or cursor direction keys to communicate direction information and command selections to processor(s) 2110 and to control cursor movement on the display device 2150. The computing system 2100 may also receive user input from a remote device that is communicatively coupled via one or more network interface(s) 2180.

The computing system 2100 further may include one or more network interface(s) 2180 to provide access to a network, such as a local area network. The network interface(s) 2180 may include, for example, a wireless network interface having antenna 2185, which may represent one or more antenna(e). The computing system 2100 can include multiple wireless network interfaces such as a combination of Wi-Fi, Bluetooth®, near field communication (NFC), and/or cellular telephony interfaces. The network interface(s) 2180 may also include, for example, a wired network interface to communicate with remote devices via network cable 2187, which may be, for example, an Ethernet cable, a coaxial cable, a fiber optic cable, a serial cable, or a parallel cable.

In one embodiment, the network interface(s) 2180 may provide access to a local area network, for example, by conforming to IEEE 802.11 standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 2180 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 2100 can further include one or more energy sources 2105 and one or more energy measurement systems 2145. Energy sources 2105 can include an AC/DC adapter coupled to an external power source, one or more batteries, one or more charge storage devices, a USB charger, or other energy source. Energy measurement systems include at least one voltage or amperage measuring device that can measure energy consumed by the computing system 2100 during a predetermined period of time. Additionally, one or more energy measurement systems can be included that measure, e.g., energy consumed by a display device, cooling subsystem, Wi-Fi subsystem, or other frequently used or high-energy consumption subsystem.

The following clauses and/or examples pertain to specific embodiments or examples thereof. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Various components can be a means for performing the operations or functions described.

Embodiments described herein provide for a multi-process model to support compiling applications for multiple platforms. In one embodiment, applications designed for execution on a mobile platform can be ported to and/or compiled for execution on a desktop/laptop platform without requiring modification of the core program code of the mobile application. The mobile application is executed using a multi-process (e.g., two or more process) model in which the core mobile application program generates content that is displayed by a host process. The host process enables automatic translation of program calls to generate mobile user interface elements into program calls that generate user interface elements of the host platform. The translation can be performed using a multi-process (e.g., two or more process) model in which the core application program generates content that is displayed by a host process.

One embodiment provides a method of displaying user interface elements of an application via a multi-process model. The method comprises launching, on a second platform, a first process linked with a first graphical interface framework of a first platform and launching, on the second platform, a second process linked with a second graphical interface framework of the second platform. The method additionally includes establishing an inter-process communication link between the first process and the second process, instantiating, by the first process, a first graphical interface element using the first graphical interface framework, instantiating, by the second process, a second graphical interface element using the second graphical interface framework, and using the inter-process communication link, displaying the first graphical interface element within the second graphical interface element.

One embodiment provides for a non-transitory machine readable medium storing instructions which, when executed by one or more processors on a host computing platform, cause the one or more processors to perform operations comprising the method of displaying user interface elements of an application via a multi-process model described herein. In one embodiment the instructions stored on the non-transitory machine-readable medium can be executed by a data processing system described herein.

One embodiment provides for a data processing system comprising a memory to store instructions for a multi-platform library and a multi-platform application and one or more processors to execute instructions in memory. The multi-platform application can be configured to execute as at least a first process and a second process. The instructions in memory can cause the one or more processors to load the multi-platform application for execution, wherein the first process of the multi-platform application includes program logic developed for a first platform and the second process of the multi-platform application includes program logic developed for a second platform. During the load of the multi-platform application, the one or more processors can parse an object file of the multi-platform application to determine a set of symbols to resolve. A first symbol in the set of symbols can be associated with the first device platform. The second symbol in the set of symbols can be associated with the second device platform. The one or more processors can be further configured to resolve the first symbol and the second symbol via the multi-platform library and bind the first symbol and second symbol to memory associated with multi-platform library.

One embodiment provides for a non-transitory machine readable medium storing instructions which, when executed by one or more processors on a computing device, causes the computing device to perform operations comprising establishing an inter-process communication session from a client process to a service process on the computing device, accessing a protocol interface from the client process that enables access to a service provided by the service process, wherein the protocol interface is associated with a remote proxy of an implementation of the service, programmatically creating a remote instance of the implementation of the service via the remote proxy, and programmatically invoking functionality provided by the service process at the client process.

One embodiment provides for a data processing system comprising a memory to store instructions and one or more processors to execute the instructions. The instructions cause the one or more processors to establish an inter-process communication session from a client process to a service process on a computing device, access a protocol interface from the client process that enables access to a service provided by the service process, wherein the protocol interface is associated with a remote proxy of an implementation of the service, programmatically create a remote instance of the implementation of the service via the remote proxy, and programmatically invoke functionality provided by the service process at the client process.

One embodiment provides for a method implemented on a computing device. The method comprises establishing an inter-process communication session from a client process to a service process on the computing device, accessing a protocol interface from the client process that enables access to a service provided by the service process, wherein the protocol interface is associated with a remote proxy of an implementation of the service, programmatically creating a remote instance of the implementation of the service via the remote proxy, and programmatically invoking functionality provided by the service process at the client process.

One embodiment provides for a non-transitory machine readable medium storing instructions which, when executed by one or more processors on a computing device, causes the computing device to perform operations comprising launching multi-process application on the computing device, where the multi-process application includes a content process linked with a first graphical interface framework of a first platform and a host process linked with a second graphical interface framework of a second platform. The instructions can additionally cause the computing device to programmatically invoke functionality provided by the host process from the content process, where programmatically invoking the functionality causes execution of a program code subroutine at the host process. The program code subroutine at the host process can cause the display of a user interface element via the second graphical interface framework, where the user interface element is generated at least in part using the first graphical interface framework. While waiting for a reply from the program code subroutine at the host process, the computing device can receive a remote invocation of functionality provided by the content process from the host process, reentrantly execute a program code subroutine of the content process in response to the remote invocation from the host process, return a result of execution of the program decode subroutine of the content process to the host process, and display the user interface element on a display device of the computing device. A characteristic of the user interface element can depend on a result of the execution of the program code subroutine of the content process.

One embodiment provides for a data processing system comprising a memory to store instructions and one or more processors to execute the instructions. The instructions cause the one or more processors to launch multi-process application on a computing device, where the multi-process application includes a content process linked with a first graphical interface framework of a first platform and a host process linked with a second graphical interface framework of a second platform. The one or more processors can additionally programmatically invoke functionality provided by the host process from the content process, wherein programmatic invocation of the functionality causes execution of a program code subroutine at the host process, the program code subroutine at the host process to display a user interface element via the second graphical interface framework, the user interface element generated at least in part using the first graphical interface framework. During a wait for a reply from the program code subroutine at the host process, the one or more processors can receive a remote invocation of functionality provided by the content process from the host process, reentrantly execute a program code subroutine of the content process in response to the remote invocation from the host process, return a result of execution of the program code subroutine of the content process to the host process, and display the user interface element on a display device of the computing device. A characteristic of the user interface element can depend on a result of the execution of the program code subroutine of the content process.

One embodiment provides for a computer implemented method that includes launching multi-process application on the computing device, where the multi-process application includes a content process linked with a first graphical interface framework of a first platform and a host process linked with a second graphical interface framework of a second platform. The method can additionally include programmatically invoking functionality provided by the host process from the content process, where programmatically invoking the functionality causes execution of a program code subroutine at the host process. The program code subroutine at the host process can cause the display of a user interface element via the second graphical interface framework, where the user interface element is generated at least in part using the first graphical interface framework. While waiting for a reply from the program code subroutine at the host process, the computer on which the method is implemented can receive a remote invocation of functionality provided by the content process from the host process, reentrantly execute a program code subroutine of the content process in response to the remote invocation from the host process, return a result of execution of the program decode subroutine of the content process to the host process, and display the user interface element on a display device of the computing device. A characteristic of the user interface element can depend on a result of the execution of the program code subroutine of the content process.

The above examples do not include an exhaustive list of all embodiments enabled by this disclosure. All systems and methods can be practiced from all suitable combinations of the various aspects and embodiments described herein. For example, a further embodiment provides for an electronic device that is configurable to implement methods or operations described herein. Thus, those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A method of displaying user interface elements of an application via a multi-process model, the method comprising:
launching, on a second platform, a first process of the application, the first process linked with a first graphical interface framework of a first platform;
launching, on the second platform, a second process of the application, the second process linked with a second graphical interface framework of the second platform;
establishing an inter-process communication link between the first process and the second process;
instantiating, by the first process, a first graphical interface element using the first graphical interface framework;
instantiating, by the second process, a second graphical interface element using the second graphical interface framework; and
using the inter-process communication link, displaying the first graphical interface element within the second graphical interface element.

2. The method as in claim 1, additionally comprising establishing the inter-process communication link via a process manager associated with the application, the process manager to manage the first process and the second process on behalf of the application.

3. The method as in claim 1, additionally comprising:
generating content for the application at the first process; and
displaying the content for the application within the first graphical interface element while displaying the first graphical interface element within the second graphical interface element.

4. The method as in claim 1, additionally comprising:
receiving a first input event at the second graphical interface element;
translating the first input event into a second input event; and
providing the second input event to the first graphical interface element via the inter-process communication link.

5. The method as in claim 4, additionally comprising interpreting, by the first process, the second input event as a copy or paste event.

6. The method as in claim 4, additionally comprising interpreting, by the first process, the second input event as part of a drag event or a drop event.

7. The method as in claim 4, wherein the first input event is a click event received from a mouse or a touchpad and the second input event is a touchscreen touch event.

8. The method as in claim 4, wherein the first input event is a multi-touch event received from a touchpad and the second input event is a touchscreen multi-touch event.

9. The method as in claim 4, wherein the second graphical interface element is a graphical user interface window, the graphical user interface window managed by a window manager of a desktop user interface.

10. The method as in claim 1, additionally comprising:
receiving a first input event at the second graphical interface element;
interpreting the first input event at the second process; and
providing a software event associated with an interpretation of the first input event to the first process via the inter-process communication link.

11. The method as in claim 1, additionally comprising:
instantiating, by the first process, a third graphical interface element;
receiving indication of instantiation of the third graphical interface element at the second process via the inter-process communication link; and
displaying, by the second process, the third graphical interface element as a fourth graphical interface element.

12. The method as in claim 11, additionally comprising automatically displaying the fourth graphical interface element by the second process in response to a message received from the first process via the inter-process communication link.

13. The method as in claim 12, additionally comprising automatically generating one or more components of the fourth graphical interface element based on components of the third graphical interface element.

14. The method as in claim 13, wherein the fourth graphical interface element is a graphical menu.

15. The method as in claim 13, wherein the fourth graphical interface element is a search bar.

16. A non-transitory machine readable medium storing instructions which, when executed by one or more processors on a host computing platform, cause the one or more processors to perform operations to display user interface elements of an application via a multi-process model, the operations comprising:
launching, on a second platform, a first process of the application, the first process linked with a first graphical interface framework of a first platform;
launching, on the second platform, a second process of the application, the second process linked with a second graphical interface framework of the second platform;
establishing an inter-process communication link between the first process and the second process;
instantiating, by the first process, a first graphical interface element using the first graphical interface framework;

instantiating, by the second process, a second graphical interface element using the second graphical interface framework; and using the inter-process communication link, displaying the first graphical interface element within the second graphical interface element.

17. The non-transitory machine readable medium as in claim 16, the operations additionally comprising establishing the inter-process communication link via a process manager associated with the application, the process manager to manage the first process and the second process on behalf of the application.

18. The non-transitory machine readable medium as in claim 16, the operations additionally comprising:
   generating content for the application at the first process;
   displaying the content for the application within the first graphical interface element while displaying the first graphical interface element within the second graphical interface element;
   receiving a first input event at the second graphical interface element;
   translating the first input event into a second input event; and
   providing the second input event to the first graphical interface element via the inter-process communication link.

19. The non-transitory machine readable medium as in claim 16, the operations additionally comprising:
   instantiating, by the first process, a third graphical interface element;
   receiving indication of instantiation of the third graphical interface element at the second process via the inter-process communication link; and
   displaying, by the second process, the third graphical interface element as a fourth graphical interface element.

20. A data processing system comprising:
   a display device;
   a memory having stored thereon, instructions to enable a first platform, a second platform, and a multi-platform application, the multi-platform application enabled via a multi-process model; and
   one or more processors to execute the instructions, wherein the instructions cause the one or more processors to:
      launch, on the second platform, a first process of the multi-platform application, the first process linked with a first graphical interface framework of the first platform;
      launch, on the second platform, a second process of the multi-platform application, the second process linked with a second graphical interface framework of the second platform;
      establish an inter-process communication link between the first process and the second process via a process manager associated with the multi-platform application, the process manager to manage the first process and the second process on behalf of the multi-platform application;
      instantiate, by the first process, a first graphical interface element using the first graphical interface framework;
      instantiate, by the second process, a second graphical interface element using the second graphical interface framework; and
      via the inter-process communication link, display on the display device the first graphical interface element within the second graphical interface element.

21. The data processing system as in claim 20, the one or more processors to:
   generate content for the multi-platform application at the first process;
   display the content for the multi-platform application within the first graphical interface element concurrently with the display of the first graphical interface element within the second graphical interface element;
   receive a first input event at the second graphical interface element;
   translate the first input event into a second input event; and
   provide the second input event to the first graphical interface element via the inter-process communication link.

22. The data processing system as in claim 20, the one or more processors to:
   instantiate, by the first process, a third graphical interface element;
   receive indication of instantiation of the third graphical interface element at the second process via the inter-process communication link; and
   display, by the second process, the third graphical interface element as a fourth graphical interface element.

* * * * *